United States Patent
Funk et al.

(10) Patent No.: US 12,093,651 B1
(45) Date of Patent: Sep. 17, 2024

(54) MACHINE LEARNING TECHNIQUES FOR NATURAL LANGUAGE PROCESSING USING PREDICTIVE ENTITY SCORING

(71) Applicant: Optum, Inc., Minnetonka, MN (US)

(72) Inventors: Nathan H. Funk, Elk River, MN (US);
Eric D. Tryon, Scandia, MN (US);
Amy L. Jensen, Brainerd, MN (US);
Sudheer Ponnala, Chandler, AZ (US);
M. P. S. Jagannadha Rao, Hyderabad (IN); Raghav Bali, Delhi (IN); Veera Raghavendra Chikka, Hyderabad (IN);
Subhadip Maji, Medinipur (IN);
Anudeep Srivatsav Appe, Warangal (IN)

(73) Assignee: Optum, Inc., Minnetonka, MN (US)

(\*) Notice: Subject to any disclaimer, the term of this patent is extended or adjusted under 35 U.S.C. 154(b) by 404 days.

(21) Appl. No.: 17/650,457

(22) Filed: Feb. 9, 2022

Related U.S. Application Data

(60) Provisional application No. 63/148,992, filed on Feb. 12, 2021, provisional application No. 63/242,784, filed on Sep. 10, 2021.

(51) Int. Cl.
*G06F 40/279* (2020.01)
*G06F 40/295* (2020.01)
(Continued)

(52) U.S. Cl.
CPC ............ *G06F 40/295* (2020.01); *G06F 40/30* (2020.01); *G06N 20/00* (2019.01); *G06F 40/284* (2020.01)

(58) Field of Classification Search
CPC ........ G06F 40/279; G06F 40/10; G06F 40/12; G06F 40/157; G06F 40/16; G06F 40/177;
(Continued)

(56) References Cited

U.S. PATENT DOCUMENTS 8,533,208 B2    9/2013  Sundaresan et al.
9,225,745 B2   12/2015  Riley et al.
(Continued)

FOREIGN PATENT DOCUMENTS

JP         5143057 B2    2/2013
WO   2016/180713 A1   11/2016
(Continued)

OTHER PUBLICATIONS

"An Explorable Transformer," exBert, (2 pages), (online), [Retrieved from the Internet May 23, 2022] <URL: https://web.archive.org/web/20201122002140/https://exbert.net/exBERT.html?sentence=The%20girl%20ran%20to%20a%20local%20pub%20to%20escape%20the%20din%20of%20her%20city.&layer=0&heads=..0,1,2,3,4,5,6,7,8,9,10,11&threshold=0.7&tokenInd=null&tokenSide=null&maskInds=..9&metaMatch=pos&metaMax=pos&displayInspector=null&offsetIdxs=..-1,0,1&hideClsSep=true>.
(Continued)

*Primary Examiner* — Qi Han
(74) *Attorney, Agent, or Firm* — Alston & Bird LLP

(57) ABSTRACT

There is a need for more accurate and more efficient natural language solutions with greater semantic intelligence. This need can be addressed, for example, by natural language processing techniques that utilize predictive entity scoring. In one example, a method includes determining an overall prevalence score for the input entity data object with respect to a scored document corpus and a target section; determining a qualified prevalence score for the input entity data object with respect to a high-scoring subset of the scored document corpus; processing the input entity data object using an entity scoring machine learning model to generate the predicted entity score, wherein the entity scoring machine learning model may characterized by a plurality of multiplicative hyper-parameters and one or more additive
(Continued)

hyper-parameters; and performing one or more prediction-based actions based at least in part on the predicted entity score.

20 Claims, 11 Drawing Sheets

(51) Int. Cl.
*G06F 40/30* (2020.01)
*G06N 20/00* (2019.01)
*G06F 40/284* (2020.01)

(58) Field of Classification Search
CPC ...... G06F 40/183; G06F 40/194; G06F 40/20; G06F 40/268; G06F 40/295; G06F 40/30; G06F 40/56; G06F 40/58
USPC .......................... 704/9, 2, 1, 3, 4, 5, 10, 257
See application file for complete search history.

(56) References Cited

U.S. PATENT DOCUMENTS

| | | | |
|---|---|---|---|
| 9,336,205 | B2 | 5/2016 | Moilanen et al. |
| 10,073,822 | B2 | 9/2018 | Goyal et al. |
| 10,198,436 | B1 | 2/2019 | Dockhorn et al. |
| 10,282,389 | B2 | 5/2019 | Liang et al. |
| 10,282,468 | B2 | 5/2019 | Kim et al. |
| 10,311,529 | B1 | 6/2019 | Noel et al. |
| 10,380,260 | B2 | 8/2019 | Hewitt |
| 10,713,425 | B2 | 7/2020 | Dent et al. |
| 11,070,448 | B2 | 7/2021 | Miller et al. |
| 11,615,246 | B2 * | 3/2023 | Reisswig ............... G06F 16/367 704/9 |
| 11,632,311 | B2 | 4/2023 | Miller et al. |
| 11,837,002 | B2 * | 12/2023 | Rimchala ................ G06N 3/02 |
| 2012/0041769 | A1 | 2/2012 | Dalal et al. |
| 2013/0339101 | A1 | 12/2013 | Riley et al. |
| 2013/0339102 | A1 | 12/2013 | Riley et al. |
| 2017/0098179 | A1 | 4/2017 | Riley et al. |
| 2017/0132203 | A1 | 5/2017 | Kim et al. |
| 2019/0065464 | A1 | 2/2019 | Finley et al. |
| 2019/0156153 | A1 | 5/2019 | Can et al. |
| 2019/0362417 | A1 | 11/2019 | Patten, Jr. et al. |
| 2019/0394238 | A1 | 12/2019 | Putz et al. |
| 2020/0097616 | A1 | 3/2020 | Asur et al. |
| 2020/0193489 | A1 | 6/2020 | Rabinowitz et al. |
| 2021/0064861 | A1 * | 3/2021 | Semenov ................ G06F 17/16 |
| 2022/0044011 | A1 * | 2/2022 | Shanmugasundaram .................... G06F 40/216 |
| 2022/0188520 | A1 | 6/2022 | Iso-Sipila et al. |

FOREIGN PATENT DOCUMENTS

| | | |
|---|---|---|
| WO | 2020/101477 A1 | 5/2020 |
| WO | 2020/193966 A1 | 10/2020 |

OTHER PUBLICATIONS

"Catalytic Text Analysis," Catalytic, (Year: 2019), (online), [Retrieved from the Internet Jul. 17, 2020] <URL: https://www.catalytic.com/text-analysis>.
"RFP Weighted Scoring—Demystified," RFP360, (Year: 2019), pp. 1-7, (article), available online at https://rfp360.com/rfp-weighted-scoring-demystified/.
"United States: Direct RFP Launches The World's First RFP Automated Technology Platform," Asia News Monitor [Bangkok], May 28, 2018, (3 pages).
Attali, Yigal et al. "Automated Essay Scoring With e-rater® V.2," The Journal of Technology, Learning, and Assessment, vol. 4, No. 3, Feb. 2006, (31 pages).
Bahdanau, Dzmitry et al. "Neural Machine Translation By Jointly Learning To Align and Translate," arXiv Preprint arXiv:1409.0473v1 [cs.CL] Sep. 1, 2014, pp. 1-15.
Burstein, Jill et al. "Advanced Capabilities for Evaluating Student Writing: Detecting Off-Topic Essays Without Topic-Specific Training," In Proceedings of the 12th International Conference On Artificial Intelligence In Education, Jul. 14, 2005, pp. 112-119.
Carlson, Sybil B. et al. "Relationship of Admission Test Scores To Writing Performance Of Native and Nonnative Speakers Of English," Educational Testing Service Research Report Series 1985, vol. 1, Jun. 1985, pp. i-152., May 31, 2022.
Crossley, Scott A. et al. "Assessing Writing With The Tool For The Automatic Analysis Of Lexical Sophistication (TAALES)," Assessing Writing, vol. 38, Oct. 2018, pp. 46-50.
Devlin, Jacob et al. "BERT: Pre-Training of Deep Bidirectional Transformers For Language Understanding," arXiv Preprint arXiv:1810.04805 [cs.CL] Oct. 11, 2018, (14 pages).
Feldman, Ronen. "Techniques and Applications For Sentiment Analysis," Communications of the ACM, vol. 56, No. 4, Apr. 2013, pp. 82-89.
Ferris, Dana R. "Lexical and Syntactic Features of ESL Writing By Students At Different Levels of L2 Proficiency," Teachers of English To Speakers Of Other Languages, Inc., TESOL Quarterly, vol. 28, No. 2, (Year: 1994), pp. 414-420, DOI: 10.2307/3597446.
Goenka, Palak et al. "ESAS: Towards Practical and Explainable Short Answer Scoring (Student Abstract)." In Proceedings of The Thirty-Fourth AAAI Conference on Artificial Intelligence (AAAI-20), vol. 34., No. 10, Apr. 3, 2020, pp. 13797-13798.
Hayashi, Toshitaka et al. "Word Embeddings-Based Sentence-Level Sentiment Analysis Considering Word Importance," Acta Polytechnica Hungarica, vol. 16, No. 7, Jan. 2019, pp. 7-24.
Hiebert, Elfrieda H. "Beyond Single Readability Measures: Using Multiple Sources Of Information In Establishing Text Complexity," Journal of Education, vol. 191, No. 2, (Year: 2011), pp. 33-42, DOI:10.1177/002205741119100206.
Hochreiter, Sepp et al. "Long Short-Term Memory," Neural Computation, vol. 9, No. 8, Nov. 15, 1997, pp. 1735-1780.
HP Inc. "Critical Request For Proposals (RFPs) Requirement Insight Engine (caRRIE)," Technical Disclosure Commons, Nov. 14, 2019, pp. 1-6, available online at https://www.tdcommons.org/cgi/viewcontent.cgi?article=3748&context=dpubs_series.
Kingma, Diederik P. et al. "Adam: A Method For Stochastic Optimization," arXiv Preprint arXiv:1412.6980v1 [cs.LG] Dec. 22, 2014, pp. 1-9.
Kumar, Yaman Kumar et al. "Get IT Scored Using AutoSAS—An Automated System for Scoring Short Answers," In Proceedings of The Ninth AAAI Symposium On Educational Advances In Artificial Intelligence (EAAI-19), vol. 33., Jul. 17, 2019, pp. 9662-9669.
Le, Quoc et al. "Distributed Representations of Sentences and Documents," In Proceedings of the 31st International Conference On Machine Learning, PMLR, vol. 33, No. 2, Jun. 18, 2014, pp. 1188-1196.
Leacock, Claudia et al. "C-Rater: Automated Scoring Of Short-Answer Questions," Computers and the Humanities, vol. 37, No. 4, Nov. 2003, pp. 389-405.
Li, Jiwei et al. "Understanding Neural Networks Through Representation Erasure," arXiv Preprint arXiv:1612.08220v1 [cs.CL] Dec. 24, 2016, (17 pages).
Lundberg, Scott M. et al. "A Unified Approach To Interpreting Model Predictions," In Proceedings of the 31st Conference On Neural Information Processing Systems (NIPS 2017), Dec. 2017 pp. 4765-4774.
Maji, Subhadip et al. "An Interpretable Deep Learning System For Automatically Scoring Request For Proposals," arXiv Preprint arXiv:2008-02347v1 [cs.CL] Aug. 5, 2020, (8 pages).
Murdoch, W. James et al. "Beyond Word Importance: Contextual Decomposition To Extract Interactions From LSTMs," arXiv Preprint arXiv:1801.05453v1 [cs.CL] Jan. 16, 2018, pp. 1-14.
Pennington, Jeffrey et al. "GloVe: Global Vectors For Word Representation," In Proceedings of the 2014 Conference On Empirical Methods In Natural Language Processing (EMNLP), Oct. 25-29, 2014, pp. 1532-1543, Doha, Qatar.

(56) References Cited

OTHER PUBLICATIONS

Ramachandran, Lakshmi et al. "Identifying Patterns For Short Answer Scoring Using Graph-Based Lexico-Semantic Text Matching," In Proceedings of the Tenth Workshop on Innovative Use of NLP For Building Educational Applications, Jun. 4, 2015, pp. 97-106, DOI:10.3115/v1/W15-0612.

Redmon, Joseph et al. "YOLOv3: An Incremental Improvement," arXiv Preprint arXiv: 1804.02767 v1, [cs.CV] Apr. 8, 2018, pp. 1-6, available online at https://arxiv.org/abs/1804.02767.

Reppen, Randi. "Variation In Elementary Student Language: A Multi-Dimensional Perspective," Thesis, Northern Arizona University, (Year: 1994), (22 pages).

Ribeiro, Macro Tulio et al. "'Why Should I Trust You?' Explaining The Predictions Of Any Classifier," In Proceedings of the 22nd ACM SIGKDD International Conference On Knowledge Discovery and Data Mining, Aug. 13, 2016, pp. 1135-1144, DOI: 10.1145/2939672.2939778.

Rong, Xin. word2vec Parameter Learning Explained, arXiv Preprint arXiv:1411.2738v1 [cs.CL] Nov. 11, 2014, pp. 1-19.

Saito, Yasuhiro et al. "Evaluation of Non Functional Requirements in a Request for Proposal (RFP)," In 2012 Joint Conference of the 22nd International Workshop on Software Measurement and the 2012 Seventh International Conference on Software Process and Product Measurement, Oct. 17, 2012, pp. 106-111, Assisi, Italy, DOI: 10.1109/IWSM-MENSURA.2012.23.

Singh, Chandan et al. "Hierarchical Interpretations For Neural Network Predictions," arXiv Preprint arXiv:1806.05337v1 [cs.LG] Jun. 14, 2018, (23 pages).

Socher, Richard et al. "Recursive Deep Models For Semantic Compositionality Over A Sentiment Treebank," In Proceedings of the 2013 Conference On Empirical Methods In Natural Language Processing, Oct. 18, 2013, pp. 1631-1642, Seattle, Washington.

Strobelt, Hendrik et al. "LSTMVis: A Tool For Visual Analysis Of Hidden State Dynamics In Recurrent Neural Networks," IEEE Transactions On Visualization and Computer Graphics, vol. 24, No. 1, pp. 667-676, Jan. 2018, DOI: 10.1109/TVCG.2017.2744158. (arXiv Preprint arXiv: 1606.07461v2 [cs.CL] Oct. 30, 2017).

Sundararajan, Mukund et al. "Axiomatic Attribution For Deep Networks," In Proceedings of the 34th International Conference on Machine Learning, vol. 70, Jul. 17, 2017 pp. 3319-3328, PMLR.

Taghipour, Kaveh et al. "A Neural Approach To Automated Essay Scoring," In Proceedings of the 2016 Conference On Empirical Methods In Natural Language Processing, Nov. 1, 2016, pp. 1882-1891, Austin, Texas, DOI: 10.18653/v1/D16-1193.

Wang, Junling. "Study On Medical English Writing With The Automatic Essay Scoring Through Translation," Advances In Social Science, Education and Humanities Research, vol. 179, In 2017 5th International Education, Economics, Social Science, Arts, Sports and Management Engineering Conference (IEESASM 2017), Jan. 2018, pp. 272-276, Atlantis Press, DOI: 10.2991/ieesasm-17.2018.56.

Wang, Zhou et al. "Mean Squared Error: Love It or Leave it? A New Look At Signal Fidelity Measures," IEEE Signal Processing Magazine, vol. 26, No. 1, Jan. 2009, pp. 98-117.

Zhang, Zhilu et al. "Generalized Cross Entropy Loss For Training Deep Neural Networks With Noisy Labels," In the 32nd Conference On Advances In Neural Information Processing Systems (NeurIPS 2018), vol. 31, (Year: 2018), pp. 8778-8788, Montreal, Canada.

NonFinal Office Action for U.S. Appl. No. 18/161,969, dated May 11, 2023, (15 pages), United States Patent and Trademark Office, US.

Notice of Allowance and Fees Due for U.S. Appl. No. 18/161,969, dated Aug. 21, 2023, (8 pages), United Stats Patent and Trademark Office, US.

* cited by examiner

403A

Identify occurred entity iterations associated with an entity data object
601

For each occurred entity iteration, determine a per-iteration overall prevalence score
602

Determine the overall prevalence score for the entity data object
603

FIG. 6

| Entity | Description | RFP's |
|---|---|---|
| Process | Refer Member to Social Supports | 12 |
| Process | Perform Community Outreach (CHW) | 12 |
| Technology | Social Provider Directory | 12 |
| Person | Social Services Provider | 12 |
| Organization | Community Based Organization | 12 |
| Technology | Health Information Exchange | 12 |
| Person | Care Coordinator | 12 |
| Process | Manage Gaps in Care | 12 |
| Technology | Care Management Platform | 12 |
| KPI | Members screened by CHWs in past 12 months | 12 |
| KPI | Licensed field-based care management staff (50% in field) | 12 |
| Person | Care Manager | 12 |
| Organization | Vision Vendor | 12 |
| Process | Manage Care Plan and Outcomes | 12 |
| Person | Member | 12 |
| Organization | Pharmacy Benefit Manager | 12 |
| Technology | Utilization Management Platform | 12 |

MACHINE LEARNING TECHNIQUES FOR NATURAL LANGUAGE PROCESSING USING PREDICTIVE ENTITY SCORING

CROSS-REFERENCES TO RELATED APPLICATIONS

The present application claims priority to: (i) U.S. Provisional Patent Application No. 63/148,992, filed on Feb. 12, 2021, and (ii) U.S. Provisional Patent Application No. 63/242,784, filed on Sep. 10, 2021, both of which are incorporated herein in entirety.

BACKGROUND

Various embodiments of the present invention address technical challenges related to performing efficient and effective natural language processing with greater semantic intelligence.

BRIEF SUMMARY

In general, embodiments of the present invention provide methods, apparatuses, systems, computing devices, computing entities, and/or the like for performing efficient and effective natural language processing with greater semantic intelligence by utilizing entity scoring machine learning models.

In accordance with one aspect, a method includes: determining a plurality of entity data objects associated with the input document data object, wherein: (i) the plurality of entity data objects are associated with a plurality of entity categories, (ii) the plurality of entity categories comprise one or more extractive list-based entity categories, (iii) each extractive list-based entity category is associated with an extractive list data object, and (iv) each extractive list data object for a particular extractive list-based entity category is generated by: (a) determining a historical extractive list data object for the particular extractive list-based entity category that describes one or more historical candidate entity data objects associated with the particular extractive list-based entity category; (b) generating, using a structured text extraction machine learning model and based at least in part on a training document data object, one or more structured text representations for one or more target document elements having a target document element type that is associated with the particular extractive list-based entity category, wherein each target document element is associated with one or more newly-extracted candidate entity data objects; (c) for each target document element: (1) generating, based at least in part on the structured text representation for the target document element and using a structured text embedding machine learning model, an element-wise embedding, (2) determining an element-wise embedding similarity measure for the element-wise embedding and a master list embedding for the particular extractive list-based entity category, and (3) in response to determining that the element-wise embedding similarity measure satisfies an element-wise embedding similarity measure threshold, updating the historical extractive list data object using the one or more newly-extracted candidate entity data objects for the target document element; (4) for each entity data object, generating, using an entity scoring machine learning model, a predicted entity score set comprising one or more predicted entity scores for the entity data object with respect to one or more target sections of the input document data object based at least in part on a scored document corpus; generating, using a document scoring machine learning model and based at least in part on each predicted entity score set, a predicted document score; and performing one or more prediction-based actions based at least in part on the predicted document score.

In accordance with another aspect, a method includes: determining an overall prevalence score for an input entity data object with respect to a scored document corpus and a target section; determining a qualified prevalence score for the input entity data object with respect to a high-scoring subset of a scored document corpus; processing the input entity data object using an entity scoring machine learning model to generate a predicted entity score, wherein: (i) the entity scoring machine learning model is characterized by a plurality of multiplicative hyper-parameters and one or more additive hyper-parameters, (ii) the plurality of multiplicative hyper-parameters comprise an overall prevalence multiplicative hyper-parameter that is determined based at least in part on the overall prevalence score and a qualified prevalence multiplicative hyper-parameter that is determined based at least in part on the qualified prevalence score, and (iii) the one or more additive hyper-parameters comprise a qualified prevalence additive hyper-parameter that is determined based at least in part on the qualified prevalence score; and performing one or more prediction-based actions based at least in part on the predicted entity score.

In accordance with another aspect, an apparatus comprising at least one processor and at least one memory including program code, the at least one memory and the program code configured to, with the processor, cause the apparatus to at least: determine a plurality of entity data objects associated with the input document data object, wherein: (i) the plurality of entity data objects are associated with a plurality of entity categories, (ii) the plurality of entity categories comprise one or more extractive list-based entity categories, (iii) each extractive list-based entity category is associated with an extractive list data object, and (iv) each extractive list data object for a particular extractive list-based entity category is generated by: (a) determining a historical extractive list data object for the particular extractive list-based entity category that describes one or more historical candidate entity data objects associated with the particular extractive list-based entity category; (b) generating, using a structured text extraction machine learning model and based at least in part on a training document data object, one or more structured text representations for one or more target document elements having a target document element type that is associated with the particular extractive list-based entity category, wherein each target document element is associated with one or more newly-extracted candidate entity data objects; (c) for each target document element: (1) generating, based at least in part on the structured text representation for the target document element and using a structured text embedding machine learning model, an element-wise embedding, (2) determining an element-wise embedding similarity measure for the element-wise embedding and a master list embedding for the particular extractive list-based entity category, and (3) in response to determining that the element-wise embedding similarity measure satisfies an element-wise embedding similarity measure threshold, updating the historical extractive list data object using the one or more newly-extracted candidate entity data objects for the target document element; (4) for each entity data object, generate, using an entity scoring machine learning model, a predicted entity score set comprising one or more predicted entity scores for the entity data object with respect to one or more target sections of the input document data object based at least in part on a scored document corpus; generate, using a document scoring machine learning model and based at least in part on each predicted entity score set, a predicted document score; and perform one or more prediction-based actions based at least in part on the predicted document score.

In accordance with another aspect, an apparatus comprising at least one processor and at least one memory including program code, the at least one memory and the program code configured to, with the processor, cause the apparatus to at least: determine an overall prevalence score for an input entity data object with respect to a scored document corpus and a target section; determine a qualified prevalence score for the input entity data object with respect to a high-scoring subset of a scored document corpus; process the input entity data object using an entity scoring machine learning model to generate a predicted entity score, wherein: (i) the entity scoring machine learning model is characterized by a plurality of multiplicative hyper-parameters and one or more additive hyper-parameters, (ii) the plurality of multiplicative hyper-parameters comprise an overall prevalence multiplicative hyper-parameter that is determined based at least in part on the overall prevalence score and a qualified prevalence multiplicative hyper-parameter that is determined based at least in part on the qualified prevalence score, and (iii) the one or more additive hyper-parameters comprise a qualified prevalence additive hyper-parameter that is determined based at least in part on the qualified prevalence score; and perform one or more prediction-based actions based at least in part on the predicted entity score.

In accordance with yet another aspect, a computer program product computer program comprising at least one non-transitory computer-readable storage medium having computer-readable program code portions stored therein, the computer-readable program code portions configured to: determine a plurality of entity data objects associated with the input document data object, wherein: (i) the plurality of entity data objects are associated with a plurality of entity categories, (ii) the plurality of entity categories comprise one or more extractive list-based entity categories, (iii) each extractive list-based entity category is associated with an extractive list data object, and (iv) each extractive list data object for a particular extractive list-based entity category is generated by: (a) determining a historical extractive list data object for the particular extractive list-based entity category that describes one or more historical candidate entity data objects associated with the particular extractive list-based entity category; (b) generating, using a structured text extraction machine learning model and based at least in part on a training document data object, one or more structured text representations for one or more target document elements having a target document element type that is associated with the particular extractive list-based entity category, wherein each target document element is associated with one or more newly-extracted candidate entity data objects; (c) for each target document element: (1) generating, based at least in part on the structured text representation for the target document element and using a structured text embedding machine learning model, an element-wise embedding, (2) determining an element-wise embedding similarity measure for the element-wise embedding and a master list embedding for the particular extractive list-based entity category, and (3) in response to determining that the element-wise embedding similarity measure satisfies an element-wise embedding similarity measure threshold, updating the historical extractive list data object using the one or more newly-extracted candidate entity data objects for the target document element; (4) for each entity data object, generate, using an entity scoring machine learning model, a predicted entity score set comprising one or more predicted entity scores for the entity data object with respect to one or more target sections of the input document data object based at least in part on a scored document corpus; generate, using a document scoring machine learning model and based at least in part on each predicted entity score set, a predicted document score; and perform one or more prediction-based actions based at least in part on the predicted document score.

In accordance with yet another aspect, a computer program product computer program comprising at least one non-transitory computer-readable storage medium having computer-readable program code portions stored therein, the computer-readable program code portions configured to: determine an overall prevalence score for an input entity data object with respect to a scored document corpus and a target section; determine a qualified prevalence score for the input entity data object with respect to a high-scoring subset of the scored document corpus; process the input entity data object using an entity scoring machine learning model to generate the predicted entity score, wherein: (i) the entity scoring machine learning model is characterized by a plurality of multiplicative hyper-parameters and one or more additive hyper-parameters, (ii) the plurality of multiplicative hyper-parameters comprise an overall prevalence multiplicative hyper-parameter that is determined based at least in part on the overall prevalence score and a qualified prevalence multiplicative hyper-parameter that is determined based at least in part on the qualified prevalence score, and (iii) the one or more additive hyper-parameters comprise a qualified prevalence additive hyper-parameter that is determined based at least in part on the qualified prevalence score; and perform one or more prediction-based actions based at least in part on the predicted entity score.

BRIEF DESCRIPTION OF THE DRAWINGS

Figure 1:
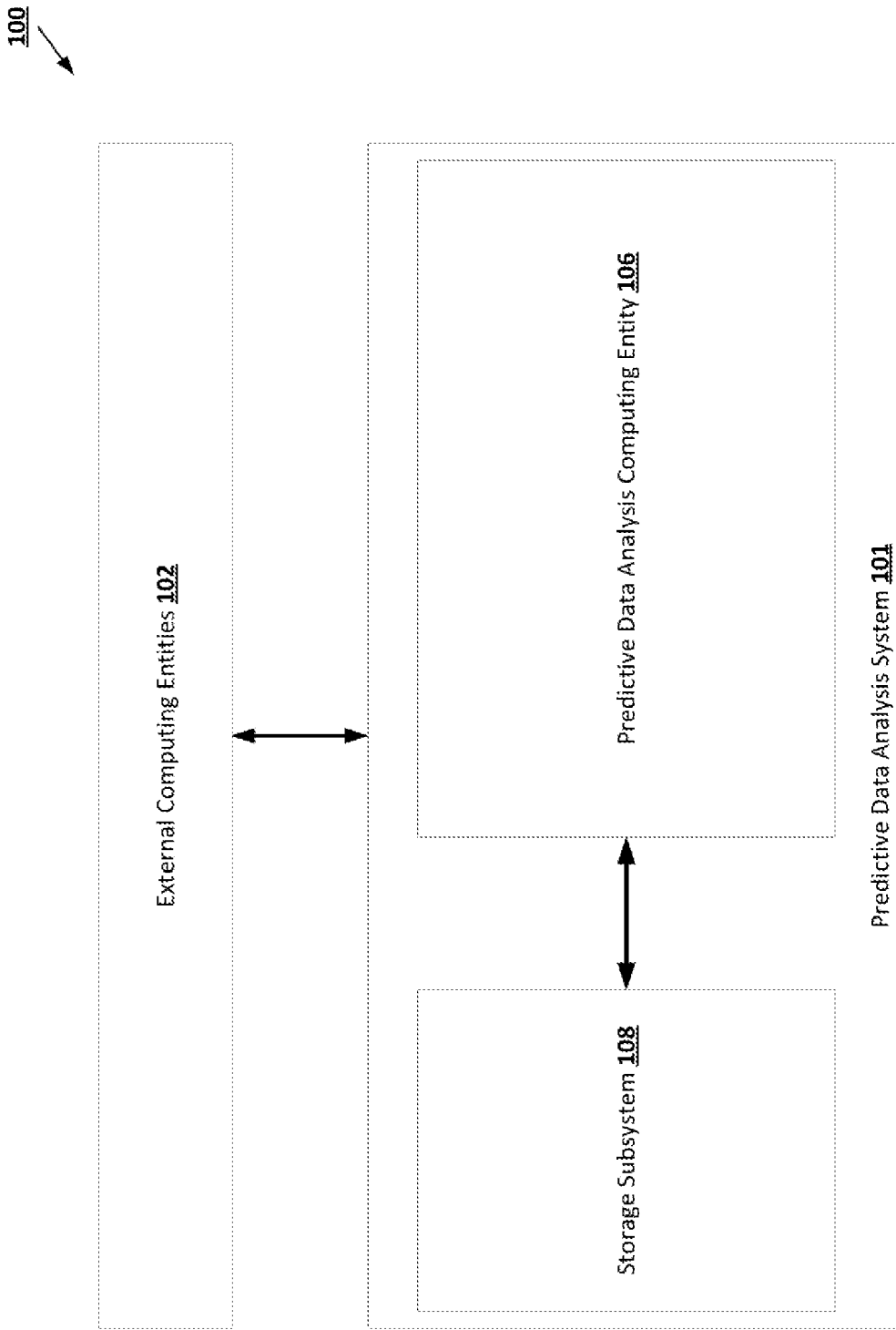
Figure 2:
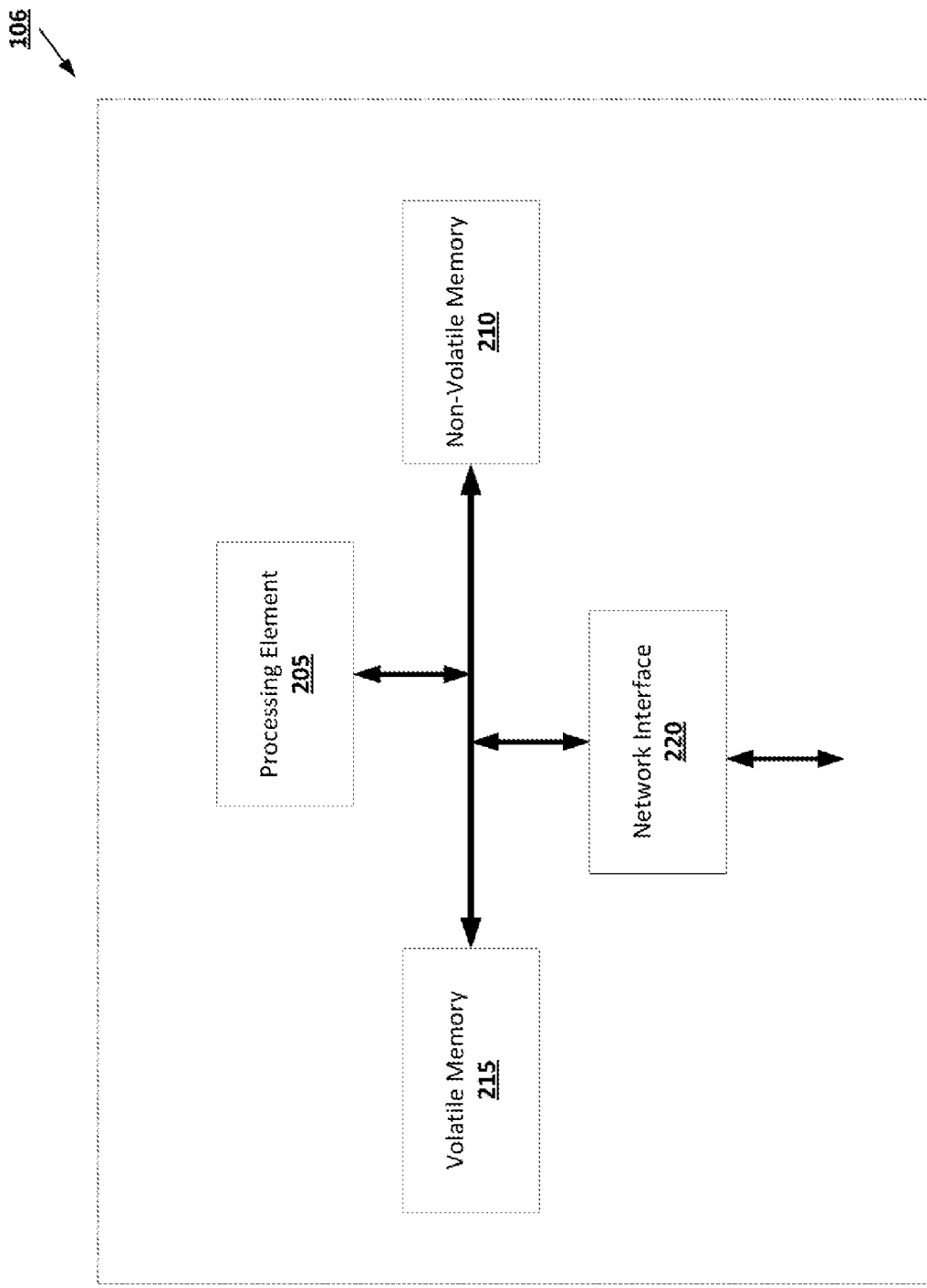
Figure 3:
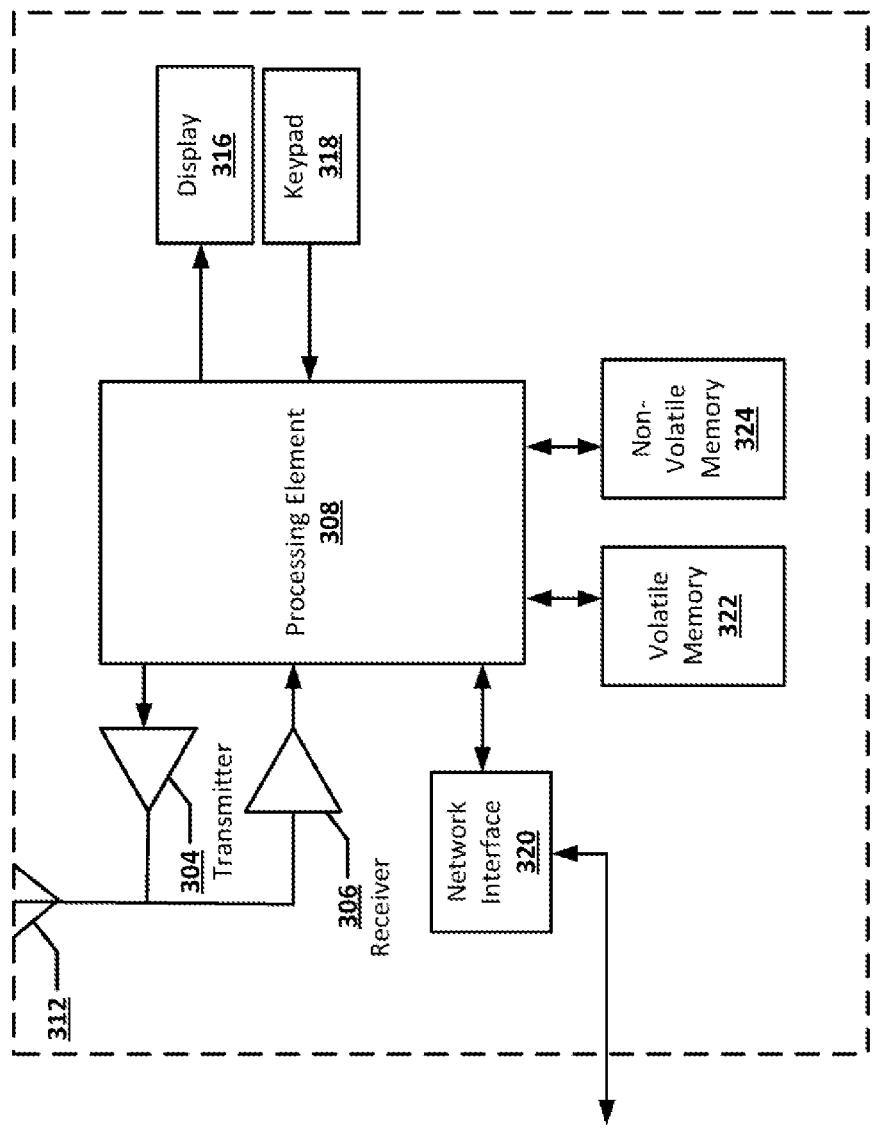
Figure 4:
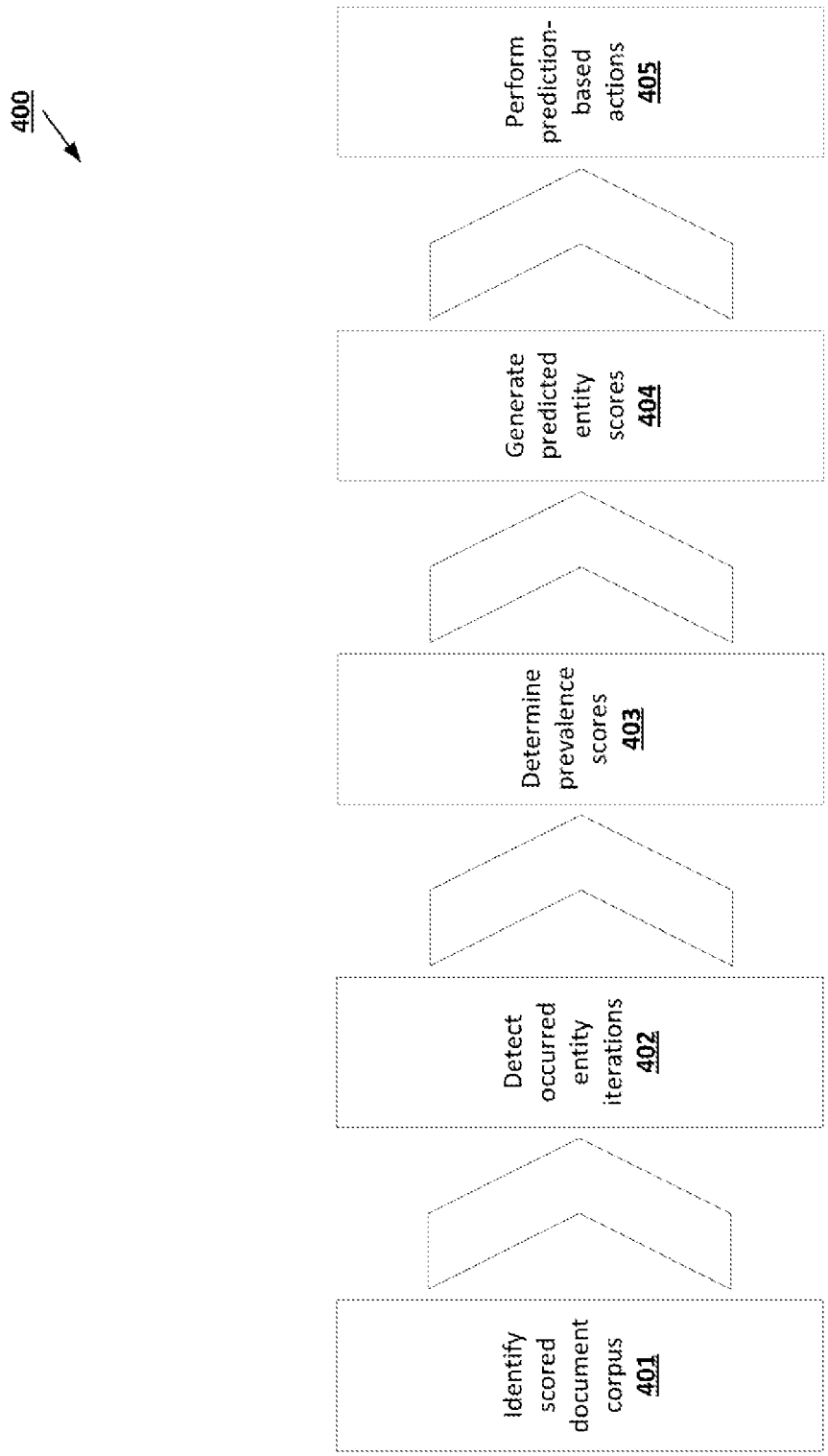
Figure 5:
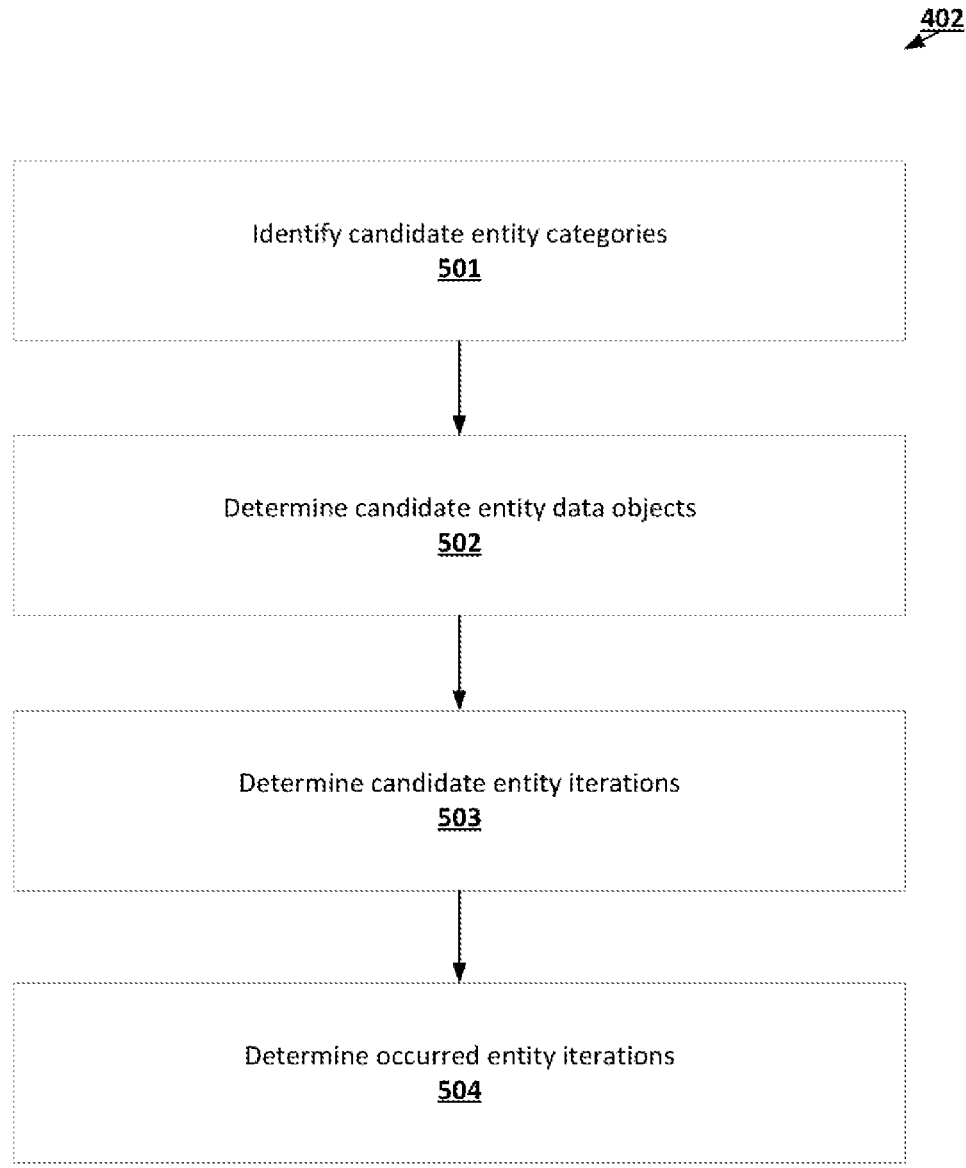
Figure 7:
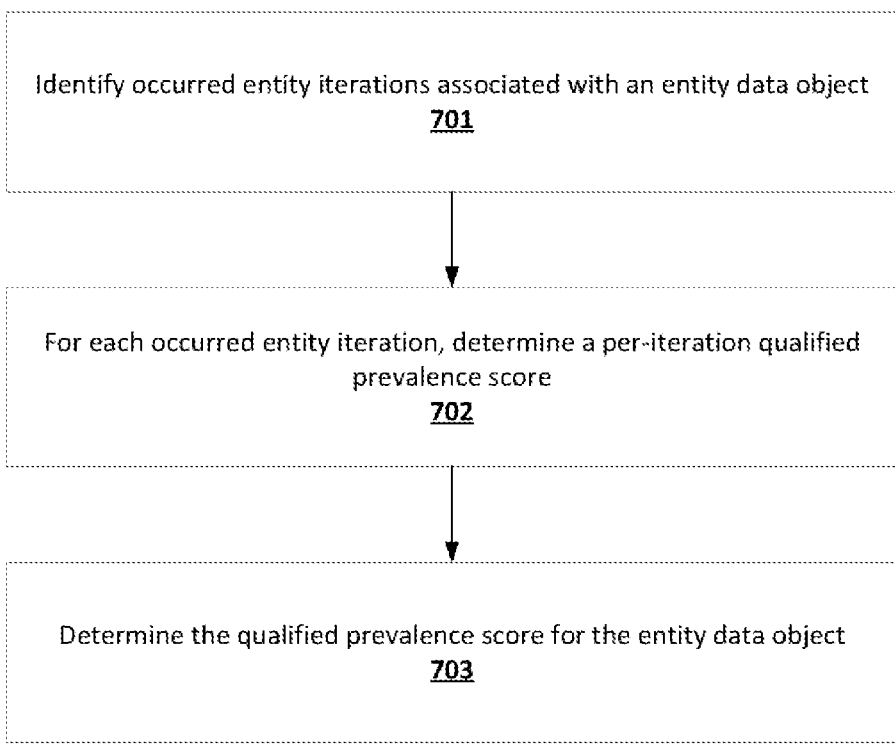
Figures 2, 8:
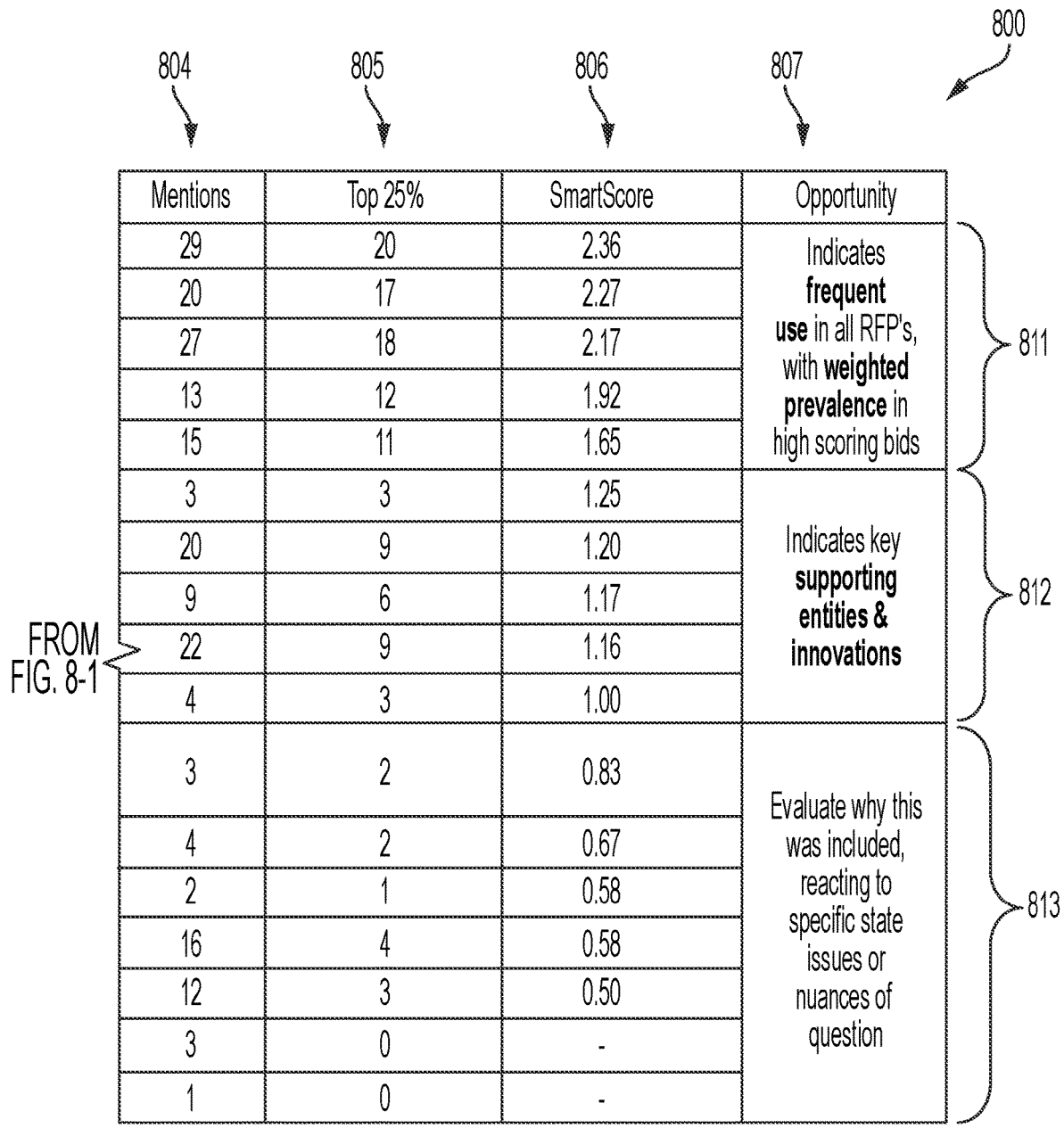
Figure 10:
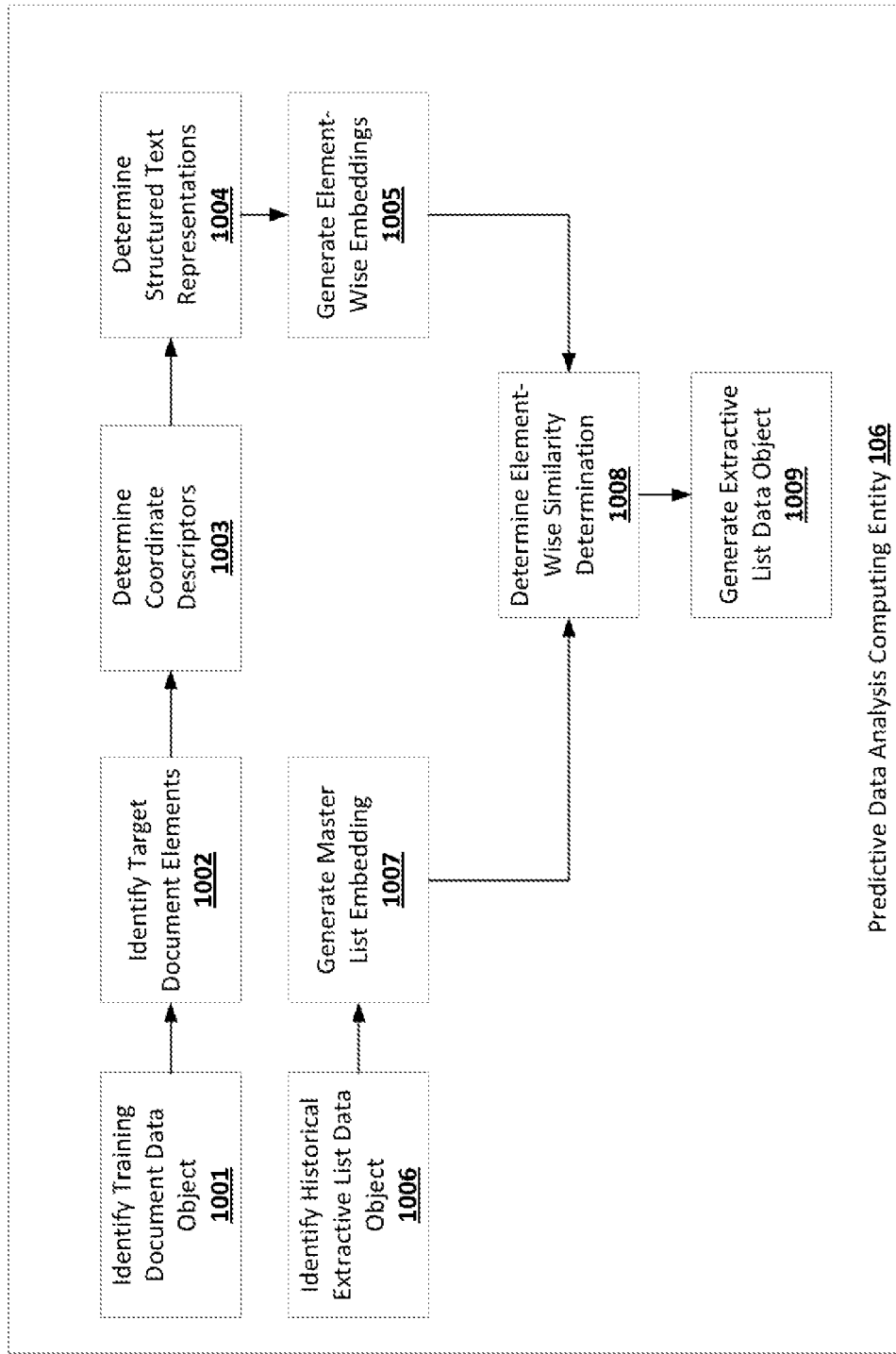

Having thus described the invention in general terms, reference will now be made to the accompanying drawings, which are not necessarily drawn to scale, and wherein:

FIG. 1 provides an exemplary overview of a system that can be used to practice embodiments of the present invention;

FIG. 2 provides an example predictive data analysis computing entity in accordance with some embodiments discussed herein;

FIG. 3 provides an example external computing entity in accordance with some embodiments discussed herein;

FIG. 4 provides a flowchart diagram of an example process for predictive entity scoring in accordance with some embodiments discussed herein;

FIG. 5 provides a flowchart diagram of an example process for detecting one or more occurred entity iterations in a scored document corpus in accordance with some embodiments discussed herein;

FIG. 6 provides a flowchart diagram of an example process for determining an overall prevalence score for an entity data object in relation to a target section of a scored document corpus in accordance with some embodiments discussed herein;

FIG. 7 provides a flowchart diagram of an example process for determining a qualified prevalence score for an entity data object in relation to a high-scoring subset of a scored document corpus in accordance with some embodiments discussed herein;

FIGS. 8-1, 8-2, and -9 provide operational examples of two prediction output user interfaces in accordance with some embodiments discussed herein; and FIG. 10 is a data flow diagram of an example process for generating/updating an extractive entity list for a particular extractive list-based entity category in accordance with some embodiments discussed herein.

DETAILED DESCRIPTION

Various embodiments of the present invention are described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. Overview and Technical Advantages

Various embodiments of the present invention address technical challenges related to improving efficiency of performing semantically aware natural language processing. Existing natural language processing systems require performing complex non-linear operations when performing many natural language processing tasks such as document scoring (e.g., baseline document scoring, document scoring based at least in part on a predicted adherence of a document such as an RFP response to a publicly available contract deemed complaint with corresponding RFP requirements, and/or the like) and/or real-time document modification recommendation. Because these non-linear operations are computationally expensive, it is difficult to perform semantically aware natural language processing in a time-efficient manner, a limitation that for example hampers the capability of various existing natural language processing systems in performing real-time document processing. An exemplary limitation of various existing natural language processing systems relates to the inability of the existing systems to perform real-time document scoring for a document in order to generate recommendations for modification of the document to boost the document score for the noted document. Because of the complex non-linear operations performed by various existing natural language processing systems, the noted existing natural language processing systems are not able to effectively perform real-time document scoring and generate recommendations for modification of documents (e.g., generated based at least in part on comparisons with a base document) to boost the document scores for the noted documents.

To address the above-noted technical challenges associated with performing semantically aware natural language processing, various embodiments of the present invention describe entity scoring machine learning models that are configured to generate predicted entity scores for semantically significant entity data objects associated with documents using a linear combination of a set of precomputed hyper-parameters. Because the noted entity scoring machine learning models rely on linear operations, they avoid the runtime efficiency issues of various existing machine learning models that rely on complex non-linear operations and thus improve the speed of performing various natural language processing tasks in a real-time or near-real-time manner. Moreover, because the noted entity scoring machine learning models rely on precomputed hyper-parameters rather than hyper-parameters that are computed at runtime, they are able to delegate various processing tasks to training time, which in turn increases the runtime efficiency of the natural language processing systems that utilize the noted entity scoring machine learning models, thus enables the noted natural language processing systems to more efficiently and more effectively perform various real-time natural language processing tasks.

Importantly, the precomputed hyper-parameters used by various entity scoring machine learning models describe feature data related to occurrence of entity iterations of semantically-defined entities within documents. This key aspect of various entity scoring machine learning models described herein enables the natural language processing techniques described herein to perform effective and efficient semantically aware natural language processing. As described above, various entity scoring machine learning models described herein rely on techniques (e.g., utilization of linear operational structures, utilization of precomputed hyperparameters about features data associated with semantically defined entities, and/or the like) that facilitate more efficient and effective performance of semantically aware natural language processing tasks and in turn enable performing semantically aware natural language processing tasks under real-time or near-real-time constraints. The noted various entity scoring machine learning accomplish these objectives by reducing the computational complexity of the runtime operations that need to be performed in order to perform semantically aware natural language processing tasks, which in turn reduces the number of processing cycles that need to be performed in order to do a complete semantically aware natural language processing task. For example, various embodiments of the present invention enable utilizing a liner combination of precomputed hyper-parameters about an entity data object to generate a predicted entity score for the entity data object in a shorter span time and with a fewer number of processing cycles relative to various existing natural language processing solutions. In doing so, various embodiments of the present invention make important technical contributions to the field of natural language processing by describing novel and technologically advantageous techniques for more efficiently and effectively performing semantically aware natural language processing.

An exemplary application of the concepts discussed herein relates to recommending which entity data objects to include and/or not include in RFP response documents. Various embodiments of the present invention describe solutions for processing an overall prevalence score for an entity data object with respect to a target segment of an RFP response document repository and a qualified prevalence score for the entity data object with respect to a high-scoring subset of the RFP response document to generate a "smart score" that describes whether and how much inclusion of language corresponding to the entity data object in a target segment of an RFP response increases the likelihood of success of the noted RFP response. The noted embodiments accomplish the described objectives by utilizing entity scoring machine learning models that are configured to generate predicted entity scores for semantically significant entity data objects associated with RFP response documents that in turn compute a linear combination of a set of precomputed hyper-parameters, where the set of precomputed hyper-parameters are determined in accordance with the noted semantically significant entity data objects. In doing so, various embodiments of the present invention describe techniques for efficient real-time and/or near-real-time scoring of RFP documents and for efficient real-time and/or near-real-time scoring of terms used in various sections of the noted RFP documents.

II. Definitions of Certain Terms

The term "scored document corpus" may refer to an electronically-stored data construct that is configured to describe a group of documents, where each document in the group of documents is associated with a ground-truth score. For example, the scored document corpus may include a group of documents, where each document describes a recorded response to an RFP (e.g., recorded RFP responses retrieved from a database that may have been generated using Freedom of Information Act (FOIA) requests). In the noted example, the ground-truth score for an RFP response document may describe an observed/estimated measure of likelihood of success of the RFP response document in securing a financial/material reward that is associated with the RFP. In some embodiments, the ground-truth score for an RFP response document is determined based at least in part on observed data about whether the RFP response document succeeded in securing a target financial/material reward and/or based at least in part on observed data about how much financial/material reward the RFP response document obtained. In some embodiments, the ground-truth score for an RFP response document (or other type of document) is determined by processing the RFP response document using a document scoring machine learning model in order to generate the ground-truth score for the RFP response document (or other type of document). Accordingly, in some embodiments, at least some of the techniques described herein may be used in conjunction with existing document scoring machine learning techniques in order to supplement the predictive insights of the noted existing document scoring machine learning techniques by the entity-frequency-based concepts discussed herein. Each document in a scored document corpus may be represented as a one-dimensional array, a two-dimensional array, a collection of one or more text arrays, a collection of one or more document-based embeddings, and/or the like.

The term "document scoring machine learning model" may refer to an electronically-stored data construct that is configured to describe parameters, hyper-parameters, and/or stored operations of a machine learning model that is configured to process feature values associated with an input document data object in order to generate a predicted document score for the input document data object. In some embodiments, the document scoring machine learning model is a trained machine learning model that is configured to process a document embedding associated with the input document data object (e.g., a document embedding generated using a Doc2Vec algorithm) in order to generate the predicted document score for the input document data object. In some embodiments, the document scoring machine learning model may be trained using observed data about effectiveness of various documents. For example, when a corpus of training documents includes a group of RFP response documents, a corresponding document scoring machine learning model may be trained using observed data about whether the RFP response documents succeeded in securing a target financial/material reward and/or about how much financial/material reward the RFP response documents obtained. In some embodiments, the document scoring machine learning model may be a natural language processing machine learning model. In some embodiments, the document scoring machine learning model is a trained machine learning model that is configured to process one or more measures of term/entity frequency associated with the input document data object in order to generate the predicted document score for the input document data object. The parameters/hyper-parameters of a document scoring machine learning model may be represented as a one-dimensional array, a two-dimensional array, a collection of one or embeddings, and/or the like.

The term "entity category" may refer to an electronically-stored data construct that is configured to describe a common categorical designation for a group of candidate entity data objects that are deemed to refer to a common subject-matter category. For example, a process entity category may be associated with candidate entity data objects that describe processes (e.g., business processes) performed in a system. As another example, a performance indicator entity category may be associated with candidate entity data objects that describe performance indicators (e.g., key performance indicators (KPIs)) of a system. As yet another example, an actor entity category may be associated with candidate entity data objects that describe actors (e.g., individuals, positions, roles, and/or the like) within a system. As a further example, an organizational entity category may be associated with candidate entity data objects that describe organizational entities within a system. As an additional example, a technology entity category may be associated with candidate entity data objects that describe technological infrastructure capabilities associated with a system. As an additional example, a capability entity category may be associated with candidate entity data objects that describe functional capabilities associated with a system.

The term "process entity category" may refer to an electronically-stored data construct that is configured to describe a categorical designation for a set of associated entity data objects that each describe a process (e.g., a business process) performed in a system. Examples of entity data objects that are associated with the process entity category include an entity data object that describes a process of referring health insurance members to social services, an entity data object that describes a process of performing community outreach, an entity data object that describes the process of managing gaps in care, an entity data object that describes managing care plans and outcomes, and/or the like.

The term "performance indicator entity category" may refer to an electronically-stored data construct that is configured to describe a categorical designation for a set of associated entity data objects that each describe a performance indicator (e.g., a KPI) used to measure a system. Examples of entity data objects that are associated with the performance indicator entity category include an entity data object that describes the KPI characterized by the number of members of a health insurance system, an entity data object that describes the KPI characterized by the number of community outreach teams in the past twelve months, an entity data object that describes the KPI characterized by the number of licensed field-based care management individuals/teams in the field, and/or the like.

The term "actor indicator entity category" may refer to an electronically-stored data construct that is configured to describe a categorical designation for a set of associated entity data objects that each describe a set of actors (e.g., individuals, positions, roles, and/or the like) within a system. Examples of entity data objects that are associated with the actor entity category include an entity data object that describes social service providers, an entity data object that describes care coordinators, an entity data object that describes members, an entity data object that describes providers, an entity data object that describes auditors, an entity data object that describes pharmacy technicians, and/or the like.

The term "organizational indicator entity category" may refer to an electronically-stored data construct that is configured to describe a categorical designation for a set of associated entity data objects that each describe an organization within a system. Examples of entity data objects that are associated with the organizational entity category include an entity data object that describes a community-based organization, an entity data object that describes a vision vendor organization, an entity data object that describes a pharmacy benefit manager organization, and/or the like.

The term "technology indicator entity category" may refer to an electronically-stored data construct that is configured to describe a categorical designation for a set of associated entity data objects that each describe a technological infrastructure capability associated with a system. Examples of entity data objects that are associated with the technology entity category include an entity data object that describes a social provider directory, an entity data object that describes a health information exchange category, an entity data object that describes a care management platform, an entity data object that describes a utilization management platform, and/or the like.

The term "entity data object" may refer to an electronically-stored data construct that is configured to describe a conceptual designation for a real-world entity that is in turn associated with the subject-matter category described by an entity category. As described above, each entity category may be associated with one or more entity data objects. Thus, as described above, examples of entity data objects that are associated with the process entity category include an entity data object that describes a process of referring health insurance members to social services, an entity data object that describes a process of performing community outreach, an entity data object that describes the process of managing gaps in care, an entity data object that describes managing care plans and outcomes, and/or the like; examples of entity data objects that are associated with the performance indicator entity category include an entity data object that describes the KPI characterized by the number of members of a health insurance system, an entity data object that describes the KPI characterized by community outreach teams in the past twelve months, an entity data object that describes the KPI characterized by the number of licensed field-based care management individuals/teams in the field, and/or the like; examples of entity data objects that are associated with the actor entity category include an entity data object that describes social service providers, an entity data object that describes care coordinators, an entity data object that describes members, an entity data object that describes providers, an entity data object that describes auditors, an entity data object that describes pharmacy technicians, and/or the like; examples of entity data objects that are associated with the organizational entity category include an entity data object that describes a community-based organization, an entity data object that describes a vision vendor organization, an entity data object that describes a pharmacy benefit manager organization, and/or the like; and examples of entity data objects that are associated with the technology entity category include an entity data object that describes a social provider directory, an entity data object that describes a health information exchange category, an entity data object that describes a care management platform, an entity data object that describes a utilization management platform, and/or the like. An entity data object may be represented as a one-dimensional array, a two-dimensional array, a collection of one or embeddings, and/or the like.

The term "entity iteration" may refer to an electronically-stored data construct that is configured to describe an ordered combination of words that describes a lexical representation of a real-world entity associated with a corresponding entity data object within a document. For example, an entity data object describing medical providers may be associated with the following entity iterations: an entity iteration describing the phrase "doctors," an entity iteration describing the phrase "physicians," an entity iteration describing the phrase "providers," an entity iteration describing the phrase "medical providers," and/or the like. As depicted by this example, each entity data object may be associated with one or more entity iterations. In some embodiments, to identify the entity iterations associated with an entity data object, one or more feature values associated with the entity data object (e.g., a Word2 Vec representation of a standard lexical form of the entity data object) is provided to a text annotation machine learning model, and the text annotation machine learning model is then configured to identify the entity iterations for the entity data object based at least in part on the features values associated with the entity data object.

The term "overall prevalence score" may refer to an electronically-stored data construct that is configured to describe an occurrence frequency measure for a corresponding entity data object in a target section of a document corpus. For example, consider a document corpus that includes three documents D1, D2, and D3, where each of the three documents includes sections S1 and S2. In the noted example, an overall prevalence score that is associated with an entity data object with respect to target section S1 is determined based at least in part on: (i) an occurrence frequency of the entity data object with respect to section S1 of document D1, (ii) an occurrence frequency of the entity data object with respect to section S1 of document D2, and (iii) an occurrence frequency of the entity data object with respect to section S1 of document D3. For example, the overall prevalence score of the entity data object with respect to target section S1 may be determined based at least in part on a ratio of: (i) the sum of the occurrence count of the entity data object with respect to section S1 of document D1, the occurrence count of the entity data object with respect to section S1 of document D2, and the occurrence count of the entity data object with respect to section S1 of document D3, and (ii) a measure of size of (e.g., the total number of words of) section S1 of document D1, section S1 of document D2, and section S1 of document D3.

The term "target section" may refer to an electronically-stored data construct that is configured to describe a common subject-matter-based designation for a collection of text data that may occur in at least some documents within a document corpus. For example, a target section may relate to a "common question" of a set of common questions that are deemed to frequently occur in RFPs. In the noted examples, a target section that is associated with a corresponding common question may be associated with text segments within RFP responses that respond to the corresponding common question. Thus, an overall prevalence score for a particular entity data object with respect to a target section is configured to describe the occurrence frequency of the particular entity data object across all text segments corresponding to the target section in a document corpus. For example, in the exemplary document corpus described above that includes three documents D1, D2, and D3 where each of the three documents includes sections S1 and S2, the overall prevalence score for a particular entity data object with respect to target section S1 is determined may describe a combination of: (i) an occurrence frequency of the entity data object with respect to section S1 of document D1, (ii) an occurrence frequency of the entity data object with respect to section S1 of document D2, and (iii) an occurrence frequency of the entity data object with respect to section S1 of document D3.

The term "per-iteration overall prevalence score" may refer to an electronically-stored data construct that is configured to describe an occurrence frequency of an entity iteration for an entity data object with respect to a target section in a document corpus. For example, if the entity data object describes medical providers and is associated with an entity iteration describing the phrase "doctors," an entity iteration describing the phrase "physicians," an entity iteration describing the phrase "providers," and an entity iteration describing the phrase "medical providers," the following per-iteration overall prevalence scores may be determined: (i) a per-iteration overall prevalence score that describes the occurrence frequency of the phrase "doctors" within a target section of a document corpus, (ii) a per-iteration overall prevalence score that describes the occurrence frequency of the phrase "physicians" within the target section of the document corpus, (iii) a per-iteration overall prevalence score that describes the occurrence frequency of the phrase "providers" within the target section of the document corpus, and (iv) a per-iteration overall prevalence score that describes the occurrence frequency of the phrase "medical providers" within the target section of the document corpus.

The term "qualified prevalence score" may refer to an electronically-stored data construct that is configured to describe the occurrence frequency of a corresponding entity data object across a high-scoring subset (e.g., the top 20% high-scoring subset) of a scored document corpus. For example, consider a scored document corpus that includes the documents D1, D2, and D3, where the high-scoring subset of the scored document corpus includes the documents D1 and D2. In the noted example, the qualified prevalence score for an entity data object is determined based at least in part on: (i) the occurrence frequency of the entity data object across document D1, and (ii) the occurrence frequency of the entity data object across document D2. For example, the qualified prevalence score for the entity data object may be determined based at least in part on a ratio of: (i) an occurrence count of the entity data object across the documents D1 and D2 (i.e., across the high-scoring subset of the scored document corpus), and (ii) the occurrence count of the entity data object across the documents D1-D3 (i.e., across all of the scored document corpus).

The term "per-iteration qualified prevalence score" may refer to an electronically-stored data construct that is configured to describe an occurrence frequency of an entity iteration for an entity data object in a high-scoring subset of a document corpus. For example, if the entity data object describes medical providers and is associated with an entity iteration describing the phrase "doctors," an entity iteration describing the phrase "physicians," an entity iteration describing the phrase "providers," and an entity iteration describing the phrase "medical providers," the following per-iteration qualified prevalence scores may be determined: (i) a per-iteration qualified prevalence score that describes the occurrence frequency of the phrase "doctors" within a high-scoring subset of a document corpus, (ii) a per-iteration qualified prevalence score that describes the occurrence frequency of the phrase "physicians" within the high-scoring subset of the document corpus, (iii) a per-iteration qualified prevalence score that describes the occurrence frequency of the phrase "providers" within the high-scoring subset of the document corpus, and (iv) a per-iteration qualified prevalence score that describes the occurrence frequency of the phrase "medical providers" within the high-scoring subset of the document corpus.

The term "high-scoring subset" may refer to an electronically-stored data construct that is configured to describe a segment of a scored document corpus whose ground-truth scores exceed a threshold ground-truth score and/or whose ground-truth scores are among a predefined ratio of top ground-truth scores of the documents in the scored document corpus. As described above, in some embodiments, the scored document corpus may be generated by processing an unscored document corpus using a document scoring machine learning model. A document scoring machine learning model may describe a machine learning model that is configured to process feature values associated with an input document data object in order to generate a predicted document score for the input document data object.

The term "predicted entity score" may refer to an electronically-stored data construct that is configured to describe a relative contribution of potential addition of a text segment comprising a corresponding entity data object as part of a corresponding target section to the likelihood of success of a document including the text segment. For example, consider a document corpus that includes the documents D1, D2, and D3, where the document corpus is associated with the candidate sections S1-S2, and further where the high-scoring subset of the document corpus includes the documents D1-D2. In the noted example, the predicted entity score for an entity data object in relation to section S1 may be determined based at least in part on: (i) the overall prevalence score for the entity data object across section S1 of the documents D1-D3, and (ii) the qualified prevalence score for the entity data object across all of the documents D1-D2. A predicted entity score may in some embodiments be represented as a one-dimensional array, a two-dimensional array, a collection of one or embeddings, and/or the like. In some embodiments, a predicted entity score is correlated across multiple documents, e.g., across multiple RFP response documents.

The term "entity scoring machine learning model" may refer to an electronically-stored data construct that is configured to describe parameters, hyper-parameters, and/or defined operations of a machine learning model that is configured to generate predicted entity scores for entity data objects and is characterized by a group of hyper-parameters, where at least a subset of the group of hyper-parameters may optionally be associated with one or more trained parameters (e.g., one or more trained weights, one or more trained bias factors, and/or the like). In general, a hyper-parameter of the entity scoring machine learning model may be a value that is determined based at least in part on precomputed features of an input document data object corpus (e.g., based at least in part on overall prevalence scores, qualified prevalence scores, and/or the like) and supplied as predetermined inputs to the entity scoring machine learning model. Examples of hyper-parameters of an entity scoring machine learning model include additive hyper-parameters and multiplicative hyper-parameters, as described below.

The term "multiplicative hyper-parameter" may refer to an electronically-stored data construct that is configured to describe a predetermined input to an entity scoring machine learning model that is modified in accordance with a multiplication-based arithmetic operation chain involving one or more other multiplicative hyper-parameters of the entity scoring machine learning model. Examples of multiplicative hyper-parameters of an entity scoring machine learning model include: (i) an overall prevalence multiplicative hyper-parameter that is determined based at least in part on the overall prevalence score for a particular entity data object with respect to a target section of a particular scored document corpus, and (ii) a qualified prevalence multiplicative hyper-parameter that is determined based at least in part on the qualified prevalence score for the particular entity data object with respect to a high-scoring subset of the particular scored document corpus. For example, in some embodiments, the entity scoring machine learning model may as part of its processing multiply the overall prevalence multiplicative hyper-parameter for a particular entity data object with respect to a target section of a particular scored document corpus and the qualified prevalence multiplicative hyper-parameter for the particular entity data object with respect to a high-scoring subset of the particular scored document corpus.

The term "additive hyper-parameter" may refer to an electronically-stored data construct that is configured to describe a predetermined input to an entity scoring machine learning model that is modified in accordance with an addition-based arithmetic operation chain involving one or more other additive hyper-parameters of the entity scoring machine learning model (e.g., an additive hyper-parameter that is determined based at least in part on the output of applying a multiplication-based operation on two or more multiplicative hyper-parameters). Examples of additive hyper-parameters of an entity scoring machine learning model include a qualified prevalence additive hyper-parameter that is determined based at least in part on the qualified prevalence score for a particular entity data object with respect to a high-scoring subset of a particular scored document corpus. For example, in some embodiments, the entity scoring machine learning model may multiply the overall prevalence multiplicative hyper-parameter for a particular entity data object with respect to a target section of a particular scored document corpus and the qualified prevalence multiplicative hyper-parameter for the particular entity data object with respect to a high-scoring subset of the particular scored document corpus to generate a resultant additive hyper-parameter value that is then added to the qualified prevalence additive hyper-parameter for the particular entity data object with respect to a high-scoring subset of the particular scored document corpus.

The term "extractive list-based entity category" may refer to an electronically-stored data construct that is configured to describe an entity category whose respective entity data objects can be extracted via matching data associated with document data objects to stored textual representation data described by the extractive list data object for the particular extractive list-based category. Each extractive list-based entity category is associated with an extractive list data object that describes textual representations for all of the candidate entity data objects that are associated with the extractive list-based entity category. For example, the extractive list data object for a particular extractive list-based entity category that is a performance indicator entity category may list the following textual representation: "Care Management Engagement Rate," "ED Visits Decreased," and "IP Visits Decreased". In some embodiments, at least some of the entity categories of a document data object can be extracted by: (i) identifying extractive list-based entity categories, (ii) for each extractive list-based entity category, retrieving the extractive list data object, and (iii) for each identified n-gram of the document data object, determining that the identified n-gram is an entity category for the document data object if the identified n-gram has a determined similarity/matching score with respect to at least one of the textual representations described by the retrieved extractive list data object(s) that satisfies (e.g., exceeds) a similarity/matching score threshold.

The term "extractive list data object" may refer to an electronically-stored data construct that is configured to describe textual representations of a set of candidate entity data objects for an extractive list-based entity category. In some embodiments, the extractive list data object for a particular extractive list-based entity category serves as a "master list" for the particular extractive list-based entity category that: (i) describes all textual representations of all candidate entity data objects associated with the particular extractive list-based entity category, and (ii) may be updated over time based at least in part on new document data objects that can be used as training data to generate the extractive list data object for the extractive list-based entity category by processing each new document data object using a defined machine learning pipeline comprising one or more machine learning models.

The term "target document element type" may refer to an electronically-stored data construct that is configured to describe a type of document elements of a set of document data objects, where only the document elements having the particular type can be used to extract candidate entity data objects for a corresponding extractive list-based entity category. In some embodiments, each extractive list-based entity category may be associated with a target document element type, such that only those document elements within training document data objects that correspond to the target document element type of a particular extractive list-based entity category may be used to extract new candidate entity data objects that correspond to the particular extractive list-based entity category. For example, a particular extractive list-based entity category (e.g., the performance indicator extractive list-based entity category) may be associated with a "table" target document element type, such that only content data associated with tables within a document data object may be used to extract new candidate entity data objects for the extractive list data object associated with the particular extractive list-based entity category.

The term "target geometric coordinate descriptor" may refer to an electronically-stored data construct that is configured to describe a set of coordinate elements that define the position of the target document element within the corresponding page. For example, when the target document element is a table document element, the geometric coordinate descriptor may describe geometric coordinates of the four vertices associated with the assumed/expected rectangular geometric configuration of the table document element. In some embodiments, to generate the target geometric coordinate descriptors of the target document elements, the pages of the document data object that include the target document elements are processed using a target element position detection machine learning model associated with the target document element type (e.g., such as a table position indication machine learning model associated with the table document element type). An example of a table position indication machine learning model is the You Only Look Once (YOLO) Object Detection Machine Learning model, aspects of which are described in Redmon et al., YOLOv3: *An Incremental Improvement*, arXiv: 1804.02767 [cs.CV], available online at https://arxiv.org/pdf/1804.02767.pdf.

The term "structured representation" may refer to an electronically-stored data construct that is configured to describe content data associated with a document element as well as structured relationships between the content data as described by the content data associated with the document element and/or by the configuration/visual depiction data associated with the document element. For example, the structured representation of a table document element may be a document having a spreadsheet format (e.g., a Microsoft Excel format) that describes content data associated with the table document element using spreadsheet rows that correspond to the rows of the table document element and spreadsheet columns that correspond to columns of the table document element. In some embodiments, to generate a structured text representation of a target document element, the following operations are performed: (i) generating an element image (e.g., a table image) for the target document element by capturing an image of a portion of a document page that includes the target document element, where the portion corresponds to the geometric coordinate descriptor for the target document element, and (ii) processing the element image using a structured text extraction.

The term "structured text extraction machine learning model" may refer to an electronically-stored data construct that is configured to describe parameters, hyper-parameters, and/or defined operations of a machine learning model that is configured to process an element image of a target document element to infer predicted content data associated with the target document element as well as structured relationships between the predicted content data. For example, the structured text extraction machine learning model may be a trained convolutional neural network machine learning model that is configured to process a table image for a table document element to generate output data describing one or more phrases depicted by the table document element as well as the cell coordinates for each phrase. In some embodiments, the input data to the structured text extraction machine learning model includes a matrix describing an image, while the output of the structured text extraction machine learning model includes a linked list of vectors, where each vector in the linked list describes the cell coordinates of a cell as well as content data associated with the cell. In some embodiments, the structured text extraction machine learning model is trained using historical ground-truth data describing structured content data of a set of target document elements, such as using structured content data of various cells of a set of table document elements.

The term "element-wise embedding" may refer to an electronically-stored data construct that is configured to describe a fixed-size representation of a corresponding target document element that is generated by a structured text embedding machine learning model. For example, the element-wise embedding of a table document element may describe a fixed-size representation of the table document element that is generated by processing the structured text representation (e.g., the spreadsheet representation) of the table document element using a structured text embedding machine learning model.

The term "structured text embedding machine learning model" may refer to an electronically-stored data construct that is configured to describe parameters, hyper-parameters, and/or defined operations of an attention-based transformer machine learning model that is configured to process, for each structured unit (e.g., each inferred table cell) of the structured text representation, an input token comprising the content data of the structured unit (e.g., the text described by the cell), and the element coordinates of the corresponding structured unit (e.g., the cell coordinates of the corresponding table cell, such as the cell coordinates describing that the cell belongs to the nth row and the mth column of the table document element), to generate an element-wise embedding of the corresponding target document element. In some embodiments, the structured text embedding machine learning model comprises an attention-based machine learning model that is configured to process, for each structured unit (e.g., each inferred table cell) of the structured text representation, an input token comprising the content data of the structured unit (e.g., the text described by the cell), and a positional embedding (e.g., a sin-cosine positional embedding) generated based at least in part on the element coordinates of the structured unit, to generate an element-wise embedding of the corresponding target document element. In some embodiments, inputs to the unit structured text embedding machine learning model comprise n vectors each describing feature data (e.g., content data, coordinate data, positional embedding data, and/or the like) for a corresponding structured unit of n structured units of a target document element. In some embodiments, outputs of the structured text embedding machine learning model comprise an m-dimensional vector describing an m-dimensional embedding of a target document element. In some embodiments, the structured text embedding machine learning model is trained as part of a machine learning framework that comprises the structured text embedding machine learning model, the entity scoring machine learning model, and the document scoring machine learning model (e.g., a machine learning framework that generates predicted document scores based predicted entity scores for a set of extracted entities, where a subset of the extracted entities are generated using an extractive list data object generated using the structured text embedding machine learning model). In some of the noted embodiments, the noted machine learning framework is generated/trained using ground-truth document scores for a set of documents.

The term "master list embedding" may refer to an electronically-stored data construct that is configured to describe a fixed-size representation of structured relationships of a historical extractive list data object as generated by a structured text embedding machine learning model. In some embodiments, because the historical extractive list data object for a particular extractive list-based entity category describes structured relationships between candidate entity data objects of the particular extractive list-based entity category and textual representations of the candidate entity data objects, it describes structured relationships that can be stored in a historical structured text representation (e.g., using a spreadsheet format). In some of the noted embodiments, once generated, a historical structured text representation can be processed by the structured text embedding machine learning model similar to the way the structured text embedding machine learning model processes structured text representation of a target document element in order to generate a master list embedding for the structured text representation that may have the same dimensions as the element-wise embeddings for target document elements as generated by the structured text representation.

The term "element-wise embedding similarity" may refer to an electronically-stored data construct that is configured to describe distance/similarity measure (e.g., a geometric distance measure, a Euclidean distance measure, and/or the like) between the element-wise representation of a corresponding target document element and a master list embedding for a corresponding extractive list-based entity category. In some embodiments, the element-wise embedding similarity for a corresponding target document element may be determined based at least in part on the output of processing the element-wise embedding for the corresponding target document element and a master list embedding for a particular extractive list-based entity category by a particular similarity determination machine learning model associated with the particular extractive list-based entity category.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatuses, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Framework

FIG. 1 is a schematic diagram of an example system architecture 100 for performing predictive data analysis steps/operations and generating corresponding user interface data (e.g., for providing and/or updating a user interface). The system architecture 100 includes a predictive data analysis system 101 comprising a predictive data analysis computing entity 106 configured to generate predictive outputs that lead to performing one or more prediction-based actions. The predictive data analysis system 101 may communicate with one or more external computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). An example of a prediction that may be generated by using the system architecture 100 is to generate predicted entity scores for potential entities in relation to RFP response documents.

The system architecture 100 includes a storage subsystem 108 configured to store at least a portion of the data utilized by the predictive data analysis system 101. The predictive data analysis computing entity 106 may be in communication with one or more external computing entities 102. The predictive data analysis computing entity 106 may be configured to receive requests and/or data from external computing entities 102, process the requests and/or data to generate predictive outputs (e.g., predictive data analysis data objects), and provide the predictive outputs to the external computing entities 102. The external computing entity 102 (e.g., management computing entity) may periodically update/provide raw input data (e.g., data objects describing primary events and/or secondary events) to the predictive data analysis system 101. The external computing entities 102 may further generate user interface data (e.g., one or more data objects) corresponding to the predictive outputs and may provide (e.g., transmit, send and/or the like) the user interface data corresponding with the predictive outputs for presentation to user computing entities operated by end-users.

The storage subsystem 108 may be configured to store at least a portion of the data utilized by the predictive data analysis computing entity 106 to perform predictive data analysis steps/operations and tasks. The storage subsystem 108 may be configured to store at least a portion of operational data and/or operational configuration data including operational instructions and parameters utilized by the predictive data analysis computing entity 106 to perform predictive data analysis steps/operations in response to requests. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. Such functions, steps/operations, and/or processes may include, for example, transmitting, receiving, operating on, processing, displaying, storing, determining, creating/generating, monitoring, evaluating, comparing, and/or similar terms used herein interchangeably. In one embodiment, these functions, steps/operations, and/or processes can be performed on data, content, information, and/or similar terms used herein interchangeably.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include or be in communication with a processing element 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include or be in communication with non-volatile media (also referred to as non-volatile storage, memory, memory storage, memory circuitry and/or similar terms used herein interchangeably). In one embodiment, the non-volatile storage or memory may include at least one non-volatile memory 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include or be in communication with volatile media (also referred to as volatile storage, memory, memory storage, memory circuitry and/or similar terms used herein interchangeably). In one embodiment, the volatile storage or memory may also include at least one volatile memory 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include a network interface 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless client communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include or be in communication with one or more input elements, such as a keyboard input, a mouse input, a touch screen/display input, motion input, movement input, audio input, pointing device input, joystick input, keypad input, and/or the like. The predictive data analysis computing entity 106 may also include or be in communication with one or more output elements (not shown), such as audio output, video output, screen/display output, motion output, movement output, and/or the like.

Exemplary External Computing Entity

FIG. 3 provides an illustrative schematic representative of an external computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, steps/operations, and/or processes described herein. External computing entities 102 can be operated by various parties. As shown in FIG. 3, the external computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the external computing entity 102 may be capable of operating with one or more air interface standards, communication protocols, modulation types, and access types. More particularly, the external computing entity 102 may operate in accordance with any of a number of wireless communication standards and protocols, such as those described above with regard to the predictive data analysis computing entity 106. In a particular embodiment, the external computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the external computing entity 102 may operate in accordance with multiple wired communication standards and protocols, such as those described above with regard to the predictive data analysis computing entity 106 via a network interface 320.

Via these communication standards and protocols, the external computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The external computing entity 102 can also download changes, add-ons, and updates, for instance, to its firmware, software (e.g., including executable instructions, applications, program modules), and operating system.

According to one embodiment, the external computing entity 102 may include location determining aspects, devices, modules, functionalities, and/or similar words used herein interchangeably. For example, the external computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the external computing entity's 102 position in connection with a variety of other systems, including cellular towers, Wi-Fi access points, and/or the like. Similarly, the external computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The external computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the external computing entity 102 to interact with and/or cause display of information/data from the predictive data analysis computing entity 106, as described herein. The user input interface can comprise any of a number of devices or interfaces allowing the external computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the external computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The external computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the external computing entity 102. As indicated, this may include a user application that is resident on the entity or accessible through a browser or other user interface for communicating with the predictive data analysis computing entity 106 and/or various other computing entities.

In another embodiment, the external computing entity 102 may include one or more components or functionality that are the same or similar to those of the predictive data analysis computing entity 106, as described in greater detail above. As will be recognized, these frameworks and descriptions are provided for exemplary purposes only and are not limiting to the various embodiments.

In various embodiments, the external computing entity 102 may be embodied as an artificial intelligence (AI) computing entity, such as an Amazon Echo, Amazon Echo Dot, Amazon Show, Google Home, and/or the like. Accordingly, the external computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

To address the technical challenges associated with performing semantically aware natural language processing, various embodiments of the present invention describe entity scoring machine learning models that are configured to generate predicted entity scores for semantically significant entity data objects associated with documents using a linear combination of a set of precomputed hyper-parameters. Because the noted entity scoring machine learning models rely on linear operations, they avoid the runtime efficiency issues of various existing machine learning models that rely on complex non-linear operations and thus improve the speed of performing various natural language processing tasks in a real-time or near-real-time manner. Moreover, because the noted entity scoring machine learning models rely on precomputed hyper-parameters rather than hyper-parameters that are computed at runtime, they are able to delegate various processing tasks to training time, which in turn increases the runtime efficiency of the natural language processing systems that utilize the noted entity scoring machine learning models, thus enables the noted natural language processing systems to more efficiently and more effectively perform various real-time natural language processing tasks.

FIG. 4 is a flowchart diagram of an example process 400 for predictive entity scoring given a scored document corpus. Via the various steps/operations of the process 400, the predictive data analysis computing entity 106 can efficiently and effectively make real-time and subject-matter-based recommendations for RFP response document drafting by precomputing predicted entity scores for a group of entity data objects prior to recommendation generation in accordance with occurrence frequency measures for the group of entity data objects across a scored RFP response document corpus.

The process 400 begins at step/operation 401 when the predictive data analysis computing entity 106 identifies the scored document corpus. For example, the predictive data analysis computing entity 106 may retrieve the scored document corpus from a storage subunit of the storage subsystem 108 of the predictive data analysis system 101. In some embodiments, the predictive data analysis computing entity 106 may generate the scored document corpus by: (i) identifying an unscored document corpus, and (ii) processing the unscored document corpus using a document scoring machine learning model in order to generate the scored document corpus.

The scored document corpus may describe a group of documents, where each document in the group of documents is associated with a ground-truth score. For example, the scored document corpus may include a group of documents, where each document describes a recorded response to an RFP. In the noted example, the ground-truth score for an RFP response document may describe an observed/estimated measure of likelihood of success of the RFP response document in securing a financial/material reward that is associated with the RFP. In some embodiments, the ground-truth score for an RFP response document is determined based at least in part on observed data about whether the RFP response document succeeded in securing a target financial/material reward and/or based at least in part on observed data about how much financial/material reward the RFP response document obtained. In some embodiments, the ground-truth score for an RFP response document (or other type of document) is determined by processing the RFP response document using a document scoring machine learning model in order to generate the ground-truth score for the RFP response document (or other type of document). Accordingly, in some embodiments, at least some of the techniques described herein may be used in conjunction with existing document scoring machine learning techniques in order to supplement the predictive insights of the noted existing document scoring machine learning techniques by the entity-frequency-based concepts discussed herein.

As described above, in some embodiments, the scored document corpus may be generated by processing an unscored document corpus using a document scoring machine learning model. A document scoring machine learning model may describe a machine learning model that is configured to process feature values associated with an input document data object in order to generate a predicted document score for the input document data object. In some embodiments, the document scoring machine learning model is a trained machine learning model that is configured to process a document embedding associated with the input document data object (e.g., a document embedding generated using a Doc2Vec algorithm) in order to generate the predicted document score for the input document data object. In some embodiments, the document scoring machine learning model may be trained using observed data about effectiveness of various documents. For example, when a corpus of training documents includes a group of RFP response documents, a corresponding document scoring machine learning model may be trained using observed data about whether the RFP response documents succeeded in securing a target financial/material reward and/or about how much financial/material reward the RFP response documents obtained. In some embodiments, the document scoring machine learning model may be a natural language processing machine learning model. In some embodiments, the document scoring machine learning model is a trained machine learning model that is configured to process one or more measures of term/entity frequency associated with the input document data object in order to generate the predicted document score for the input document data object.

At step/operation 402, the predictive data analysis computing entity 106 detects one or more occurred entity iterations in the scored document corpus. For example, the predictive data analysis computing entity 106 may identify a group of candidate entities that are associated with a group of candidate entity iterations, and subsequently detect the one or more occurred entity iterations as a subset of the group of candidate entity iterations that occur within the scored document corpus.

In some embodiments, step/operation 402 can be performed in accordance with the process that is depicted in FIG. 5. The process that is depicted in FIG. 5 begins at step/operation 501 when the predictive data analysis computing entity 106 identifies a group of candidate entity categories. An entity category may refer to a common categorical designation for a group of candidate entity data objects that are deemed to refer to a common subject-matter category. For example, a process entity category may be associated with candidate entity data objects that describe processes (e.g., business processes) performed in a system. As another example, a performance indicator entity category may be associated with candidate entity data objects that describe performance indicators (e.g., KPIs) of a system. As yet another example, an actor entity category may be associated with candidate entity data objects that describe actors (e.g., individuals, positions, roles, and/or the like) within a system. As a further example, an organizational entity category may be associated with candidate entity data objects that describe organizational entities within a system. As an additional example, a technology entity category may be associated with candidate entity data objects that describe technological infrastructure capabilities associated with a system. As an additional example, a capability entity category may be associated with candidate entity data objects that describe functional capabilities associated with a system.

In some embodiments, a process entity category is a categorical designation for a set of associated entity data objects that each describe a process (e.g., a business process) performed in a system. Examples of entity data objects that are associated with the process entity category include an entity data object that describes a process of referring health insurance members to social services, an entity data object that describes a process of performing community outreach, an entity data object that describes the process of managing gaps in care, an entity data object that describes managing care plans and outcomes, and/or the like.

In some embodiments, a performance indicator entity category is a categorical designation for a set of associated entity data objects that each describe a performance indicator (e.g., a KPI) used to measure a system. Examples of entity data objects that are associated with the performance indicator entity category include an entity data object that describes the KPI characterized by the number of members of a health insurance system, an entity data object that describes the KPI characterized by the number of community outreach teams in the past twelve months, an entity data object that describes the KPI characterized by the number of licensed field-based care management individuals/teams in the field, and/or the like.

In some embodiments, an actor entity category is a categorical designation for a set of associated entity data objects that each describe a set of actors (e.g., individuals, positions, roles, and/or the like) within a system. Examples of entity data objects that are associated with the actor entity category include an entity data object that describes social service providers, an entity data object that describes care coordinators, an entity data object that describes members, an entity data object that describes providers, an entity data object that describes auditors, an entity data object that describes pharmacy technicians, and/or the like.

In some embodiments, an organizational entity category is a categorical designation for a set of associated entity data objects that each describe an organization within a system. Examples of entity data objects that are associated with the organizational entity category include an entity data object that describes a community-based organization, an entity data object that describes a vision vendor organization, an entity data object that describes a pharmacy benefit manager organization, and/or the like.

In some embodiments, a technology entity category is a categorical designation for a set of associated entity data objects that each describe a technological infrastructure capability associated with a system. Examples of entity data objects that are associated with the technology entity category include an entity data object that describes a social provider directory, an entity data object that describes a health information exchange category, an entity data object that describes a care management platform, an entity data object that describes a utilization management platform, and/or the like.

At step/operation 502, the predictive data analysis computing entity 106 identifies a group of candidate entity data objects corresponding to the group of candidate entity category. An entity data object may describe a conceptual designation for a real-world entity that is in turn associated with the subject-matter category described by an entity category. As described above, each entity category may be associated with one or more entity data objects.

Thus, as described above, examples of entity data objects that are associated with the process entity category include an entity data object that describes a process of referring health insurance members to social services, an entity data object that describes a process of performing community outreach, an entity data object that describes the process of managing gaps in care, an entity data object that describes managing care plans and outcomes, and/or the like; examples of entity data objects that are associated with the performance indicator entity category include an entity data object that describes the KPI characterized by the number of members of a health insurance system, an entity data object that describes the KPI characterized by community outreach teams in the past twelve months, an entity data object that describes the KPI characterized by the number of licensed field-based care management individuals/teams in the field, and/or the like; examples of entity data objects that are associated with the actor entity category include an entity data object that describes social service providers, an entity data object that describes care coordinators, an entity data object that describes members, an entity data object that describes providers, an entity data object that describes auditors, an entity data object that describes pharmacy technicians, and/or the like; examples of entity data objects that are associated with the organizational entity category include an entity data object that describes a community-based organization, an entity data object that describes a vision vendor organization, an entity data object that describes a pharmacy benefit manager organization, and/or the like; and examples of entity data objects that are associated with the technology entity category include an entity data object that describes a social provider directory, an entity data object that describes a health information exchange category, an entity data object that describes a care management platform, an entity data object that describes a utilization management platform, and/or the like.

At step/operation 503, the predictive data analysis computing entity 106 identifies a group of candidate entity iterations corresponding to the group of candidate entity data objects. An entity iteration may describe an ordered combination of words that describes a lexical representation of a real-world entity associated with a corresponding entity data object within a document. For example, an entity data object describing medical providers may be associated with the following entity iterations: an entity iteration describing the phrase "doctors," an entity iteration describing the phrase "physicians," an entity iteration describing the phrase "providers," an entity iteration describing the phrase "medical providers," and/or the like. As depicted by this example, each entity data object may be associated with one or more entity iterations. In some embodiments, to identify the entity iterations associated with an entity data object, one or more feature values associated with the entity data object (e.g., a Word2Vec representation of a standard lexical form of the entity data object) is provided to a text annotation machine learning model, and the text annotation machine learning model is then configured to identify the entity iterations for the entity data object based at least in part on the features values associated with the entity data object.

At step/operation 504, the predictive data analysis computing entity 106 detects the occurred entity iterations based at least in part on the group of candidate entity iterations. The occurred entity iterations may be a subset of the group of candidate entity iterations that occur at least for a predefined number of times (e.g., at least once) within the scored document corpus. In some embodiments, to detect the occurred entity iterations, the predictive data analysis computing entity 106 provides the group of candidate entity iterations to a text annotation machine learning model that is configured to detect a per-iteration overall prevalence count for each candidate entity iteration, and then detects the occurred entity iterations based at least in part on each per-iteration overall prevalence count for a candidate entity iteration in the group of candidate entity iterations. In some embodiments, to detect the occurred entity iterations, the predictive data analysis computing entity 106 provides the group of candidate entity data objects to a text annotation machine learning model that is configured to detect the group of candidate entity iterations for the group of candidate entity data objects and detect a per-iteration overall prevalence count for each candidate entity iteration, and then the predictive data analysis computing entity 106 detects the occurred entity iterations based at least in part on each per-iteration overall prevalence count for a candidate entity iteration in the group of candidate entity iterations.

In some embodiments, the entity categories comprise one or more an extractive list-based entity categories. Each extractive list-based entity category is associated with an extractive list data object that describes textual representations for all of the candidate entity data objects that are associated with the extractive list-based entity category. For example, the extractive list data object for a particular extractive list-based entity category that is a performance indicator entity category may list the following textual representation: "Care Management Engagement Rate," "ED Visits Decreased," and "IP Visits Decreased". In some embodiments, at least some of the entity categories of a document data object can be extracted by: (i) identifying extractive list-based entity categories, (ii) for each extractive list-based entity category, retrieving the extractive list data object, and (iii) for each identified n-gram of the document data object, determining that the identified n-gram is an entity category for the document data object if the identified n-gram has a determined similarity/matching score with respect to at least one of the textual representations described by the retrieved extractive list data object(s) that satisfies (e.g., exceeds) a similarity/matching score threshold.

Accordingly, for each extractive list-based entity category, at least some of the entity data objects of a document data object that are associated with the extractive list-based entity category may be determined based at least in part on matching/similarity determinations of textual data associated with a document data object with textual representations described by the extractive list data object for the extractive list-based entity category. For example, in the example described above, where the extractive list data object for a particular extractive list-based entity category that is a performance indicator entity category may list the following textual representation: "Care Management Engagement Rate," "ED Visits Decreased," and "IP Visits Decreased," if the matching/similarity score for a particular n-gram of a document data object with respect to at least one of the textual representations "Care Management Engagement Rate," "ED Visits Decreased," and "IP Visits Decreased" satisfies the corresponding threshold, then the particular n-gram may be extracted as an entity data object from the document data object (e.g., as an entity data object having the entity category of the textual representation having the highest matching/similarity score with respect to the particular n-gram).

In some embodiments, the extractive list data object for a particular extractive list-based entity category serves as a "master list" for the particular extractive list-based entity category that: (i) describes all textual representations of all candidate entity data objects associated with the particular extractive list-based entity category, and (ii) may be updated over time based at least in part on new document data objects that can be used as training data to generate/update the extractive list data object for the extractive list-based entity category by processing each new document data object using a defined machine learning pipeline comprising one or more machine learning models. Exemplary techniques for using a defined machine learning pipeline to generate the extractive list data object for a particular extractive list-based entity category are described using the various steps/operations of the process 1000 of FIG. 10, which may be performed by the predictive data analysis computing entity 106 or by another computing entity 106. Process 1000 will now be described with reference to the predictive data analysis computing entity 106.

The process 1000 of FIG. 10 begins at step/operation 1001 when the predictive data analysis computing entity 106 identifies (e.g., receives) a training document data object. As used with reference to FIG. 10, a training document data object may be any document data object that can be used to extract one or more target document elements that have a target document element type that is associated with the particular extractive list-based entity category, where the one or more target document elements can then be in turn used to generate/update the extractive list data object for the particular extractive list-based entity category. In some embodiments, the training document data object is generated by a merger of a plurality of received documents (e.g., a plurality of received portable document format (PDF) documents).

At step/operation 1002, after identifying the training document data object, the predictive data analysis computing entity 106 identifies/detects one or more target document elements having a target document element type that is associated with the particular extractive list-based entity category. Each extractive list-based entity category may be associated with a target document element type, such that only those document elements within training document data objects that correspond to the target document element type of a particular extractive list-based entity category may be used to extract new candidate entity data objects that correspond to the particular extractive list-based entity category. For example, a particular extractive list-based entity category (e.g., the performance indicator extractive list-based entity category) may be associated with a "table" target document element type, such that only content data associated with tables within a document data object may be used to extract new candidate entity data objects for the extractive list data object associated with the particular extractive list-based entity category.

In some embodiments, to extract a table document element from a training document data object, the following operations are performed: (i) for each page of the target document data object, a determination about whether the page includes a table is made, and (ii) all pages having a positive determination are merged into a single training document data object and the training data object is replaced with the single training document data object. In some embodiments, to determine whether a page includes a table, a table inclusion tag describing whether the page includes a table is used. In some embodiments, to determine whether a page includes a table, a page image of the page is processed using a trained convolutional page inclusion classification machine learning model to determine a page inclusion prediction for the page that describes a prediction about whether the page includes a table.

At step/operation 1003, the predictive data analysis computing entity 106 determines a target geometric coordinate descriptor for each target document element. In some embodiments, a target geometric coordinate descriptor describes a set of coordinate elements that define the position of the target document element within the corresponding page. For example, when the target document element is a table document element, the geometric coordinate descriptor may describe geometric coordinates of the four vertices associated with the assumed/expected rectangular geometric configuration of the table document element. In some embodiments, to generate the target geometric coordinate descriptors of the target document elements, the pages of the document data object that include the target document elements are processed using a target element position detection machine learning model associated with the target document element type (e.g., such as a table position indication machine learning model associated with the table document element type). An example of a table position indication machine learning model is the You Only Look Once (YOLO) Object Detection Machine Learning model, aspects of which are described in Redmon et al., YOLOv3: *An Incremental Improvement*, arXiv: 1804.02767 [cs. CV], available online at https://arxiv.org/pdf/1804.02767.pdf.

At step/operation 1004, the predictive data analysis computing entity 106 determines a structured text representation for each target document element. In some embodiments, a structured text representation of a document element describes content data associated with the document element as well as structured relationships between the content data as described by the content data associated with the document element and/or by the configuration/visual depiction data associated with the document element. For example, the structured representation of a table document element may be a document having a spreadsheet format (e.g., a Microsoft Excel format) that describes content data associated with the table document element using spreadsheet rows that correspond to the rows of the table document element and spreadsheet columns that correspond to columns of the table document element.

In some embodiments, to generate a structured text representation of a target document element, the following operations are performed: (i) generating an element image (e.g., a table image) for the target document element by capturing an image of a portion of a document page that includes the target document element, where the portion corresponds to the geometric coordinate descriptor for the target document element, and (ii) processing the element image using a structured text extraction machine learning model to generate the structured text representation for the element image. The structured text extraction machine learning model may be a machine learning model that is configured to process an element image of a target document element to infer predicted content data associated with the target document element as well as structured relationships between the predicted content data. For example, the structured text extraction machine learning model may be a trained convolutional neural network machine learning model that is configured to process a table image for a table document element to generate output data describing one or more phrases depicted by the table document element as well as the cell coordinates for each phrase. In some embodiments, the input data to the structured text extraction machine learning model includes a matrix describing an image, while the output of the structured text extraction machine learning model includes a linked list of vectors, where each vector in the linked list describes the cell coordinates of a cell as well as content data associated with the cell. In some embodiments, the structured text extraction machine learning model is trained using historical ground-truth data describing structured content data of a set of target document elements, such as using structured content data of various cells of a set of table document elements.

At step/operation 1005, the predictive data analysis computing entity 106 generates an element-wise embedding for each target document element. An element-wise embedding may describe a fixed-size representation of a corresponding target document element that is generated by a structured text embedding machine learning model. For example, the element-wise embedding of a table document element may describe a fixed-size representation of the table document element that is generated by processing the structured text representation (e.g., the spreadsheet representation) of the table document element using a structured text embedding machine learning model.

In some embodiments, the structured text embedding machine learning model is configured to process the structured text representation for a target document element (e.g., a table document element) to generate an element-wise embedding for the target document element (e.g., a table embedding of the table document element). In some embodiments, the structured text embedding machine learning model comprises an attention-based machine learning model that is configured to process, for each structured unit (e.g., each inferred table cell) of the structured text representation, an input token comprising the content data of the structured unit (e.g., the text described by the cell), and the element coordinates of the corresponding structured unit (e.g., the cell coordinates of the corresponding table cell, such as the cell coordinates describing that the cell belongs to the nth row and the mth column of the table document element), to generate an element-wise embedding of the corresponding target document element. In some embodiments, the structured text embedding machine learning model comprises an attention-based machine learning model that is configured to process, for each structured unit (e.g., each inferred table cell) of the structured text representation, an input token comprising the content data of the structured unit (e.g., the text described by the cell), and a positional embedding (e.g., a sin-cosine positional embedding) generated based at least in part on the element coordinates of the structured unit, to generate an element-wise embedding of the corresponding target document element.

In some embodiments, inputs to the unit structured text embedding machine learning model comprise n vectors each describing feature data (e.g., content data, coordinate data, positional embedding data, and/or the like) for a corresponding structured unit of n structured units of a target document element. In some embodiments, outputs of the structured text embedding machine learning model comprise an m-dimensional vector describing an m-dimensional embedding of a target document element. In some embodiments, the structured text embedding machine learning model is trained as part of a machine learning framework that comprises the structured text embedding machine learning model, the entity scoring machine learning model, and the document scoring machine learning model (e.g., a machine learning framework that generates predicted document scores based predicted entity scores for a set of extracted entities, where a subset of the extracted entities are generated using an extractive list data object generated using the structured text embedding machine learning model). In some of the noted embodiments, the noted machine learning framework is generated/trained using ground-truth document scores for a set of documents.

At step/operation 1006, the predictive data analysis computing entity 106 identifies (e.g., receives, retrieves, and/or the like) a historical extractive list data object for the particular extractive list-based entity category, which describes a preexisting state of the extractive list data object (e.g., a pre-existing master list) for the particular extractive list-based entity category. In some embodiments, the historical extractive list data object is a pre-existing KPI master list that includes textual representations for a set of already-extracted KPI entities. In some embodiments, the extractive list data object is initialized with a set of pre-identified/pre-configured textual representations for a set of pre-identified/pre-configured entity categories.

At step/operation 1007, the predictive data analysis computing entity 106 processes the historical extractive list data object using the structured text embedding machine learning model to generate a master list embedding for the particular extractive list-based entity category. In some embodiments, because the historical extractive list data object for a particular extractive list-based entity category describes structured relationships between candidate entity data objects of the particular extractive list-based entity category and textual representations of the candidate entity data objects, it describes structured relationships that can be stored in a historical structured text representation (e.g., using a spreadsheet format). In some of the noted embodiments, once generated, a historical structured text representation can be processed by the structured text embedding machine learning model similar to the way the structured text embedding machine learning model processes structured text representation of a target document element in order to generate a master list embedding for the structured text representation that may have the same dimensions as the element-wise embeddings for target document elements as generated by the structured text representation.

At step/operation 1008, the predictive data analysis computing entity 106 determines, for each target document element type, whether an element-wise embedding similarity measure for the target document element satisfies (e.g., exceeds) an element-wise embedding similarity threshold. The element-wise embedding similarity may describe distance/similarity measure (e.g., a geometric distance measure, a Euclidean distance measure, and/or the like) between the element-wise representation of a corresponding target document element and a master list embedding for a corresponding extractive list-based entity category. In some embodiments, the element-wise embedding similarity for a corresponding target document element may be determined based at least in part on the output of processing the element-wise embedding for the corresponding target document element and a master list embedding for a particular extractive list-based entity category by a particular similarity determination machine learning model associated with the particular extractive list-based entity category.

At step/operation 1009, the predictive data analysis computing entity 106 generates the extractive list data object for the particular extractive list-based entity category by updating the historical extractive list data object for the particular extractive list-based entity category based at least in part on each newly-extracted candidate entity data object that is associated with a target document element whose respective element-wise embedding similarity measure satisfies the element-wise embedding similarity measure threshold. In other words, if the respective element-wise embedding similarity measure for a particular target document element (e.g., a particular table element) satisfies the element-wise embedding similarity measure threshold, the predictive data analysis computing entity 106 integrates feature data (e.g., content data, coordinate data, textual representation data, cell data, cell position data, cell coordinate data, and/or the like) associated with all the newly-extracted entity categories described by the particular target document element to the already-extracted historical entity categories described by the historical extractive list data object for the particular extractive list-based entity category. In some embodiments, if the respective element-wise embedding similarity measure for a particular target document element (e.g., a particular table element) fails to satisfy the element-wise embedding similarity measure threshold, the predictive data analysis computing entity 106 discards the target document element.

Returning to FIG. 4, at step/operation 403, the predictive data analysis computing entity 106 detects: (i) an overall prevalence score for each occurred entity data object of a group of occurred entity data objects associated with the identified group of occurred entity iterations with respect to a target section of a group of target sections, and (ii) a qualified prevalence score for each occurred entity data object of the group of entity data objects. Overall prevalence scores and qualified prevalence scores are described in greater detail below.

An overall prevalence score may describe an occurrence frequency measure for a corresponding entity data object in a target section of a document corpus. For example, consider a document corpus that includes three documents D1, D2, and D3, where each of the three documents includes sections S1 and S2. In the noted example, an overall prevalence score that is associated with an entity data object with respect to target section S1 is determined based at least in part on: (i) an occurrence frequency of the entity data object with respect to section S1 of document D1, (ii) an occurrence frequency of the entity data object with respect to section S1 of document D2, and (iii) an occurrence frequency of the entity data object with respect to section S1 of document D3. For example, the overall prevalence score of the entity data object with respect to target section S1 may be determined based at least in part on a ratio of: (i) the sum of the occurrence count of the entity data object with respect to section S1 of document D1, the occurrence count of the entity data object with respect to section S1 of document D2, and the occurrence count of the entity data object with respect to section S1 of document D3, and (ii) a measure of size of (e.g., the total number of words of) section S1 of document D1, section S1 of document D2, and section S1 of document D3.

A target section may refer to a common subject-matter-based designation for a collection of text data that may occur in at least some documents within a document corpus. For example, a target section may relate to a "common question" of a set of common questions that are deemed to frequently occur in RFPs. In the noted examples, a target section that is associated with a corresponding common question may be associated with text segments within RFP responses that respond to the corresponding common question. Thus, an overall prevalence score for a particular entity data object with respect to a target section is configured to describe the occurrence frequency of the particular entity data object across all text segments corresponding to the target section in a document corpus. For example, in the exemplary document corpus described above that includes three documents D1, D2, and D3 where each of the three documents includes sections S1 and S2, the overall prevalence score for a particular entity data object with respect to target section S1 is determined may describe a combination of: (i) an occurrence frequency of the entity data object with respect to section S1 of document D1, (ii) an occurrence frequency of the entity data object with respect to section S1 of document D2, and (iii) an occurrence frequency of the entity data object with respect to section S1 of document D3.

In some embodiments, the overall occurrence score for an entity data object with respect to a target section may be determined in accordance with the process 403A that is depicted in FIG. 6. The process 403A that is depicted in FIG. 6 begins at step/operation 601 when the predictive data analysis computing entity 106 identifies one or more occurred entity iterations that are associated with the particular entity data object. For example, if the entity data object describes medical providers, the predictive data analysis computing entity 106 may determine that the entity data object is associated with the following entity iterations: an entity iteration describing the phrase "doctors," an entity iteration describing the phrase "physicians," an entity iteration describing the phrase "providers," an entity iteration describing the phrase "medical providers," and/or the like.

At step/operation 602, the predictive data analysis computing entity 106 determines a per-iteration overall prevalence score for each occurred entity iteration associated with the particular entity data object. A per-iteration overall prevalence score may describe an occurrence frequency of an entity iteration for an entity data object with respect to a target section in a document corpus. For example, if the entity data object describes medical providers and is associated with an entity iteration describing the phrase "doctors," an entity iteration describing the phrase "physicians," an entity iteration describing the phrase "providers," and an entity iteration describing the phrase "medical providers," the following per-iteration overall prevalence scores may be determined: (i) a per-iteration overall prevalence score that describes the occurrence frequency of the phrase "doctors" within a target section of a document corpus, (ii) a per-iteration overall prevalence score that describes the occurrence frequency of the phrase "physicians" within the target section of the document corpus, (iii) a per-iteration overall prevalence score that describes the occurrence frequency of the phrase "providers" within the target section of the document corpus, and (iv) a per-iteration overall prevalence score that describes the occurrence frequency of the phrase "medical providers" within the target section of the document corpus.

At step/operation 603, the predictive data analysis computing entity 106 determines the overall prevalence score for the entity data object based at least in part on each per-iteration overall prevalence score for an occurred entity iteration associated with the particular entity data object. For example, example, if the entity data object describes medical providers and is associated with an entity iteration describing the phrase "doctors," an entity iteration describing the phrase "physicians," an entity iteration describing the phrase "providers," and an entity iteration describing the phrase "medical providers," the predictive data analysis computing entity 106 may determine the overall prevalence score for the noted entity data object based at least in part on (e.g., by summing) the following: (i) a per-iteration overall prevalence score that describes the occurrence frequency of the phrase "doctors" within a target section of a document corpus, (ii) a per-iteration overall prevalence score that describes the occurrence frequency of the phrase "physicians" within the target section of the document corpus, (iii) a per-iteration overall prevalence score that describes the occurrence frequency of the phrase "providers" within the target section of the document corpus, and (iv) a per-iteration overall prevalence score that describes the occurrence frequency of the phrase "medical providers" within the target section of the document corpus.

Returning to FIG. 4, a qualified prevalence score may describe the occurrence frequency of a corresponding entity data object across a high-scoring subset of a scored document corpus. For example, consider a scored document corpus that includes the documents D1, D2, and D3, where the high-scoring subset of the scored document corpus includes the documents D1 and D2. In the noted example, the qualified prevalence score for an entity data object is determined based at least in part on: (i) the occurrence frequency of the entity data object across document D1, and (ii) the occurrence frequency of the entity data object across document D2. For example, the qualified prevalence score for the entity data object may be determined based at least in part on a ratio of: (i) an occurrence count of the entity data object across the documents D1 and D2 (i.e., across the high-scoring subset of the scored document corpus), and (ii) the occurrence count of the entity data object across the documents D1-D3 (i.e., across all of the scored document corpus).

A high-scoring subset of a scored document corpus may describe a segment of the scored document corpus whose ground-truth scores exceed a threshold ground-truth score and/or whose ground-truth scores are among a predefined ratio of top ground-truth scores of the documents in the scored document corpus. As described above, in some embodiments, the scored document corpus may be generated by processing an unscored document corpus using a document scoring machine learning model. A document scoring machine learning model may describe a machine learning model that is configured to process feature values associated with an input document data object in order to generate a predicted document score for the input document data object.

In some embodiments, the qualified prevalence score for an entity data object may be determined in accordance with the process 403B that is depicted in FIG. 7. The process 403B that is depicted in FIG. 7 begins at step/operation 701 when the predictive data analysis computing entity 106 identifies one or more occurred entity iterations that are associated with the particular entity data object. For example, if the entity data object describes medical providers, the predictive data analysis computing entity 106 may determine that the entity data object is associated with the following entity iterations: an entity iteration describing the phrase "doctors," an entity iteration describing the phrase "physicians," an entity iteration describing the phrase "providers," an entity iteration describing the phrase "medical providers," and/or the like.

At step/operation 702, the predictive data analysis computing entity 106 determines a per-iteration qualified prevalence score for each occurred entity iteration associated with the particular entity data object. A per-iteration qualified prevalence score may describe an occurrence frequency of an entity iteration for an entity data object in a high-scoring subset of a document corpus. For example, if the entity data object describes medical providers and is associated with an entity iteration describing the phrase "doctors," an entity iteration describing the phrase "physicians," an entity iteration describing the phrase "providers," and an entity iteration describing the phrase "medical providers," the following per-iteration qualified prevalence scores may be determined: (i) a per-iteration qualified prevalence score that describes the occurrence frequency of the phrase "doctors" within a high-scoring subset of a document corpus, (ii) a per-iteration qualified prevalence score that describes the occurrence frequency of the phrase "physicians" within the high-scoring subset of the document corpus, (iii) a per-iteration qualified prevalence score that describes the occurrence frequency of the phrase "providers" within the high-scoring subset of the document corpus, and (iv) a per-iteration qualified prevalence score that describes the occurrence frequency of the phrase "medical providers" within the high-scoring subset of the document corpus.

At step/operation 703, the predictive data analysis computing entity 106 determines the qualified prevalence score for the entity data object based at least in part on each per-iteration qualified prevalence score for an occurred entity iteration associated with the particular entity data object. For example, example, if the entity data object describes medical providers and is associated with an entity iteration describing the phrase "doctors," an entity iteration describing the phrase "physicians," an entity iteration describing the phrase "providers," and an entity iteration describing the phrase "medical providers," the predictive data analysis computing entity 106 may determine the qualified prevalence score for the noted entity data object based at least in part on (e.g., by summing) the following: (i) a per-iteration qualified prevalence score that describes the occurrence frequency of the phrase "doctors" within a high-scoring subset of a document corpus, (ii) a per-iteration qualified prevalence score that describes the occurrence frequency of the phrase "physicians" within the high-scoring subset of the document corpus, (iii) a per-iteration qualified prevalence score that describes the occurrence frequency of the phrase "providers" within the high-scoring subset of the document corpus, and (iv) a per-iteration qualified prevalence score that describes the occurrence frequency of the phrase "medical providers" within the high-scoring subset of the document corpus.

Returning to FIG. 4, at step/operation 404, the predictive data analysis computing entity 106 generates a predicted entity score for each occurred entity data object with respect to a target section based at least in part on the overall prevalence score of the occurred entity data object with respect to the target section of the scored document corpus and the qualified prevalence for the occurred entity data object with respect to a high-scoring subset of the scored document corpus. For example, consider a document corpus that includes the documents D1, D2, and D3, where the document corpus is associated with the candidate sections S1-S2, and further where the high-scoring subset of the document corpus includes the documents D1-D2. In the noted example, the predicted entity score for an entity data object in relation to section S1 may be determined based at least in part on: (i) the overall prevalence score for the entity data object across section S1 of the documents D1-D3, and (ii) the qualified prevalence score for the entity data object across all of the documents D1-D2. In some embodiments, at step/operation 404, the predictive data analysis computing entity 106 generates a predicted entity score for a target document by comparing the target document to a model document that is deemed to include one or more satisfactory ground-truth conditions, such as a model contract document that is deemed to adhere to one or more satisfactory RFP requirements.

In some embodiments, to generate the predicted entity score for an entity data object in relation to a target section, the predictive data analysis computing entity 106 processes the entity data object using an entity scoring machine learning model. The entity scoring machine learning model may be a machine learning model characterized by a group of hyper-parameters, where at least a subset of the group of hyper-parameters may optionally be associated with one or more trained parameters (e.g., one or more trained weights, one or more trained bias factors, and/or the like). In general, a hyper-parameter of the entity scoring machine learning model may be a value that is determined based at least in part on precomputed features of an input document data object corpus (e.g., based at least in part on overall prevalence scores, qualified prevalence scores, and/or the like) and supplied as predetermined inputs to the entity scoring machine learning model. Examples of hyper-parameters of an entity scoring machine learning model include additive hyper-parameters and multiplicative hyper-parameters, as described below.

A multiplicative hyper-parameter is a predetermined input to an entity scoring machine learning model that is modified in accordance with a multiplication-based arithmetic operation chain involving other multiplicative hyper-parameters of the entity scoring machine learning model. Examples of multiplicative hyper-parameters of an entity scoring machine learning model include: (i) an overall prevalence multiplicative hyper-parameter that is determined based at least in part on the overall prevalence score for a particular entity data object with respect to a target section of a particular scored document corpus, and (ii) a qualified prevalence multiplicative hyper-parameter that is determined based at least in part on the qualified prevalence score for the particular entity data object with respect to a high-scoring subset of the particular scored document corpus. For example, in some embodiments, the entity scoring machine learning model may as part of its processing multiply the overall prevalence multiplicative hyper-parameter for a particular entity data object with respect to a target section of a particular scored document corpus and the qualified prevalence multiplicative hyper-parameter for the particular entity data object with respect to a high-scoring subset of the particular scored document corpus.

An additive hyper-parameter is a predetermined input to an entity scoring machine learning model that is modified in accordance with an addition-based arithmetic operation chain involving other additive hyper-parameters of the entity scoring machine learning model. Examples of additive hyper-parameters of an entity scoring machine learning model include a qualified prevalence additive hyper-parameter that is determined based at least in part on the qualified prevalence score for a particular entity data object with respect to a high-scoring subset of a particular scored document corpus. For example, in some embodiments, the entity scoring machine learning model may multiply the overall prevalence multiplicative hyper-parameter for a particular entity data object with respect to a target section of a particular scored document corpus and the qualified prevalence multiplicative hyper-parameter for the particular entity data object with respect to a high-scoring subset of the particular scored document corpus to generate a resultant value that is then added to the qualified prevalence additive hyper-parameter for the particular entity data object with respect to a high-scoring subset of the particular scored document corpus.

In some embodiments, the entity scoring machine learning model may perform the operations described by the below equation to generate the Pe, which is the predicted entity score for the entity data object e with respect to a target section s of a document corpus C:

$$P_s^e = \frac{\text{occurence of } e \text{ in all sections } s \text{ of } C}{\text{Size of } C} * \quad \text{Equation 1}$$
$$\frac{\text{occurence of } e \text{ in a high scoring subset of } C}{\text{occurence of } e \text{ in } C} +$$
$$\frac{\text{occurence of } e \text{ in a high scoring subset of } C}{\text{occurence of } e \text{ in } C}$$

$$\frac{\text{occurence of } e \text{ in all sections } s \text{ of } C}{\text{size of } c}$$

In the above-depicted Equation 1, is the overall prevalence score for the entity data object e with respect to the target section s of the document corpus C that is supplied as the overall prevalence multiplicative hyper-parameter of the corresponding entity scoring machine learning model. Moreover, $$\frac{\text{occurence of } e \text{ in a high scoring subset of } C}{\text{occurence of } e \text{ in } C}$$

with respect to the high-scoring subset of the document corpus (which is supplied as both the qualified prevalence multiplicative hyper-parameter of the corresponding entity scoring machine learning model and the qualified prevalence additive hyper-parameter of the corresponding entity scoring machine learning model.

In some embodiments, after being generated by the entity scoring machine learning model, the predicted entity score for an entity data object with respect to a target section is updated in accordance with a reference prevalence score for the entity data object and the target section. The reference prevalence score for an entity data object with respect to a target section may be determined based at least in part on an occurrence frequency of the entity data object in a target section subset of a reference document. A reference document may include an unscored document that is deemed to include guidance information about importance of entities to a particular predictive task. An example of a reference document is an RFP document. An example of a target section subset of an RFP document is a section of an RFP document that relates to a particular common question.

At step/operation 405, the predictive data analysis computing entity 106 performs one or more prediction-based actions based at least in part on each predicted entity score for an occurred entity data object. In some embodiments, the predictive data analysis computing entity 106 generates a plurality of entity clusters based at least in part on each predicted entity score for an input entity data object of the plurality of entity data objects, and performs the one or more prediction-based actions based at least in part on the plurality of entity clusters.

In some embodiments, performing the one or more prediction-based actions comprises causing presentation of a prediction output user interface, wherein the prediction output user interface is configured to depict one or more recommending visual effects corresponding to a high-scoring cluster of the plurality of entity clusters. In some embodiments, performing the one or more prediction-based actions comprises causing presentation of a prediction output user interface, wherein the prediction output user interface is configured to depict one or more warning visual effects corresponding to a low-scoring cluster of the plurality of entity clusters. In some embodiments, performing the one or more prediction-based actions comprises causing presentation of a prediction output user interface, wherein the prediction output user interface is configured to depict one or more supporting visual effects corresponding to a medium-scoring cluster of the plurality of entity clusters.

An operational example of a prediction output user interface 800 is depicted in FIGS. 8-1 and 8-2. As depicted in FIGS. 8-1 and 8-2, the prediction output user interface 800 depicts, for each occurred entity data object 802, an entity category 801, a document count value 803 describing a count of documents within the scored document corpus within which the entity data object occurs, an overall prevalence score 804 of the occurred entity data object with respect to a target section, a qualified prevalence score 805 of the occurred entity data object with respect to the top 25% high-scoring subset of a corresponding document corpus, a predicted entity score 806 of the occurred entity data object, and an entity cluster 807 of the occurred entity data object. As further depicted in FIGS. 8-1 and 8-2, the entity clusters include a high-scoring cluster 811, a medium-scoring cluster 812, and a low-scoring cluster 813.

Figure 9:
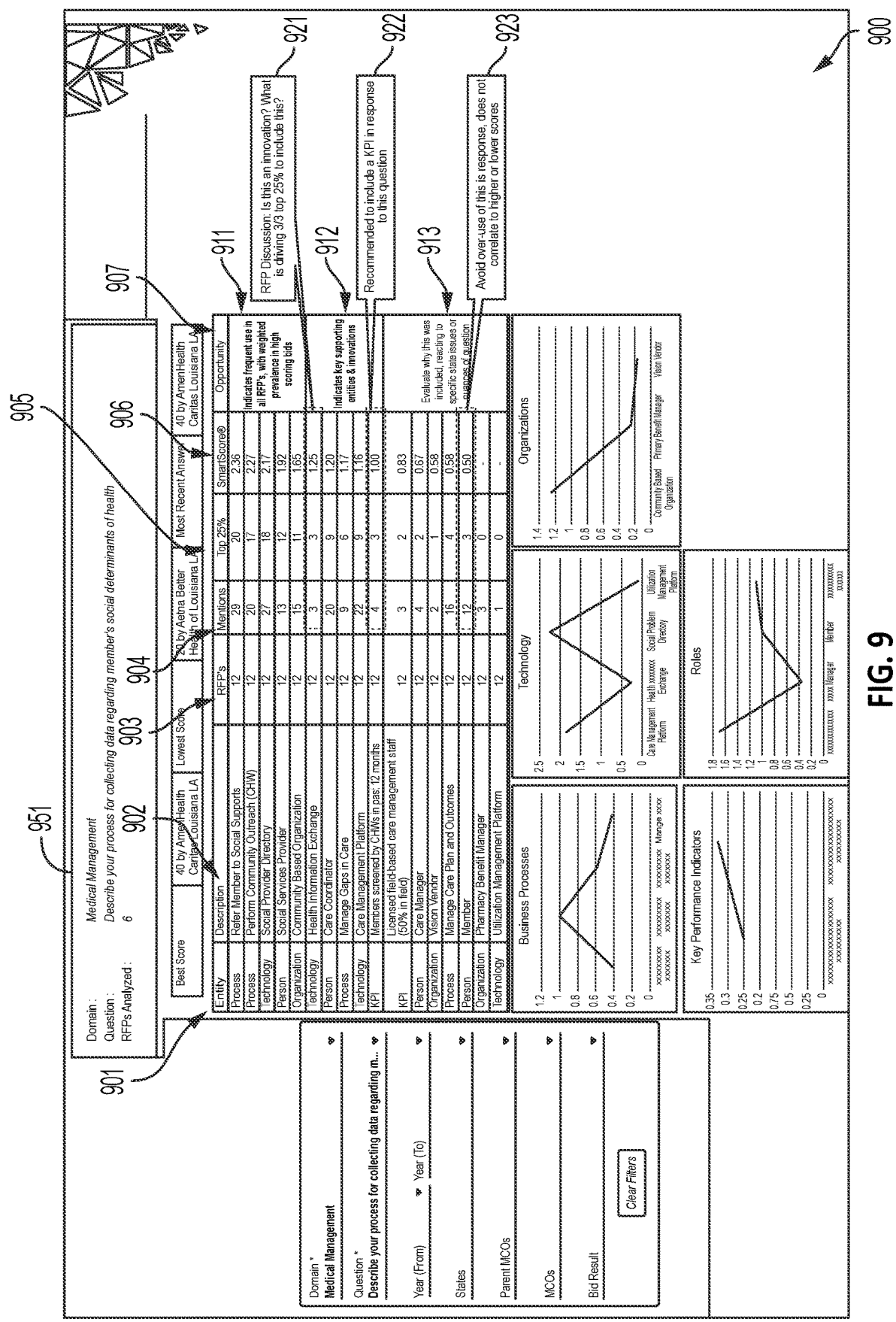

Another operational example of a prediction output user interface 900 is depicted in FIG. 9. As depicted in FIG. 9, the prediction output user interface 900, for each occurred entity data object 902, an entity category 901, a document count value 903 describing a count of documents within the scored document corpus within which the entity data object occurs, an overall prevalence score 904 of the occurred entity data object with respect to a target section 951, a qualified prevalence score 905 of the occurred entity data object with respect to the top 25% high-scoring subset of a corresponding document corpus, a predicted entity score 906 of the occurred entity data object, and an entity cluster 907 of the occurred entity data object. As further depicted in FIG. 9, the entity clusters include a high-scoring cluster 911, a medium-scoring cluster 912, and a low-scoring cluster 913, as well as the supporting visual effect 921, the supporting visual effect 922, and the warning visual effect 923. As further depicted in FIG. 9, the prediction output user interface 900 depicts graph user interface elements that each depict the predicted entity score variations across a corresponding entity category.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, an entity data object associated with an input document data object using an extractive list data object associated with the entity data object and generated by:
   (i) receiving, using a structured text extraction machine learning model, a structured text representation for a target document element of a training document data object,
   (ii) receiving, using a structured text embedding machine learning model, an element-wise embedding based at least in part on the structured text representation for the target document element,
   (iii) determining an element-wise embedding similarity measure for the element-wise embedding and a master list embedding associated with a historical extractive list data object, and
   (iv) in response to determining that the element-wise embedding similarity measure satisfies an element-wise embedding similarity measure threshold, updating the historical extractive list data object with the structured text representation;
generating, by the one or more processors and using an entity scoring machine learning model, a predicted entity score for the entity data object with respect to one or more target sections of the input document data object; and
initiating, by the one or more processors, the performance of a prediction-based action based at least in part on the predicted entity score.

2. The computer-implemented method of claim 1, wherein (a) the entity data object is associated with an entity category, (b) the entity category comprises an extractive list-based entity category, and (c) the extractive list-based entity category is associated with the extractive list data object.

3. The computer-implemented method of claim 2, wherein the extractive list-based entity category comprises a plurality of candidate entity data objects and the extractive list data object describes a plurality of textual representations corresponding to each of the plurality of candidate entity data objects.

4. The computer-implemented method of claim 3, wherein the plurality of textual representations is extracted from a plurality of training document data objects.

5. The computer-implemented method of claim 1, wherein the master list embedding is generated, using the structured text embedding machine learning model, based at least in part on the historical extractive list data object.

6. The computer-implemented method of claim 1, wherein the structured text representation is based at least in part on one or more target geometric coordinate descriptors for the target document element within the training document data object.

7. The computer-implemented method of claim 1, wherein the predicted entity score for the entity data object is based at least in part on a scored document corpus and generating the predicted entity score comprises:

determining an overall prevalence score for the entity data object with respect to the scored document corpus and a particular target section of the one or more target sections;
determining a qualified prevalence score for the entity data object with respect to a high-scoring subset of the scored document corpus; and
generating, using the entity scoring machine learning model and based at least in part on the overall prevalence score and the qualified prevalence score, the predicted entity score.

8. The computer-implemented method of claim 7, wherein (a) the entity data object is associated with an entity category of a group of entity categories, and (b) the group of entity categories comprise a process entity category, an actor entity category, a performance indicator entity category, an organizational entity category, and a technology entity category.

9. The computer-implemented method of claim 7, wherein the predicted entity score is further generated based at least in part on a reference prevalence score for the entity data object in relation to a target section subset of a reference document that is associated with the particular target section.

10. The computer-implemented method of claim 7, wherein:
(a) the entity scoring machine learning model is characterized by a plurality of multiplicative hyper-parameters and one or more additive hyper-parameters,
(b) the plurality of multiplicative hyper-parameters comprise an overall prevalence multiplicative hyper-parameter that is determined based at least in part on the overall prevalence score and a qualified prevalence multiplicative hyper-parameter that is determined based at least in part on the qualified prevalence score, and
(c) the one or more additive hyper-parameters comprise a qualified prevalence additive hyper-parameter that is determined based at least in part on the qualified prevalence score.

11. The computer-implemented method of claim 1, further comprising:
generating a plurality of entity clusters based at least in part on the predicted entity score for the entity data object, and
initiating the performance of the prediction-based action based at least in part on the plurality of entity clusters.

12. The computer-implemented method of claim 11, wherein the prediction-based action comprises:
generating user interface data for a prediction output user interface, wherein the prediction output user interface is configured to display one or more warning visual effects corresponding to a low-scoring cluster of the plurality of entity clusters.

13. A computing system comprising memory and one or more processors communicatively coupled to the memory, the one or more processors configured to:
identify an entity data object associated with an input document data object using an extractive list data object associated with the entity data object and generated by:
   (i) receiving, using a structured text extraction machine learning model, a structured text representation for a target document element of a training document data object,
   (ii) receiving, using a structured text embedding machine learning model, an element-wise embedding based at least in part on the structured text representation for the target document element,
(iii) determining an element-wise embedding similarity measure for the element-wise embedding and a master list embedding associated with a historical extractive list data object, and
(iv) in response to determining that the element-wise embedding similarity measure satisfies an element-wise embedding similarity measure threshold, updating the historical extractive list data object with the structured text representation;

generate, using an entity scoring machine learning model, a predicted entity score for the entity data object with respect to one or more target sections of the input document data object; and initiate the performance of a prediction-based action based at least in part on the predicted entity score.

14. The computing system of claim 13, wherein (a) the entity data object is associated with an entity category, (b) the entity category comprises an extractive list-based entity category, and (c) the extractive list-based entity category is associated with the extractive list data object.

15. The computing system of claim 14, wherein the extractive list-based entity category comprises a plurality of candidate entity data objects and the extractive list data object describes a plurality of textual representations corresponding to each of the plurality of candidate entity data objects.

16. The computing system of claim 15, wherein the plurality of textual representations is extracted from a plurality of training document data objects.

17. The computing system of claim 13, wherein the master list embedding is generated, using the structured text embedding machine learning model, based at least in part on the historical extractive list data object.

18. The computing system of claim 13, wherein the structured text representation is based at least in part on one or more target geometric coordinate descriptors for the target document element within the training document data object.

19. The computing system of claim 13, wherein the predicted entity score for the entity data object is based at least in part on a scored document corpus and generating the predicted entity score comprises:

determining an overall prevalence score for the entity data object with respect to the scored document corpus and a particular target section of the one or more target sections;

determining a qualified prevalence score for the entity data object with respect to a high-scoring subset of the scored document corpus; and generating, using the entity scoring machine learning model and based at least in part on the overall prevalence score and the qualified prevalence score, the predicted entity score.

20. One or more non-transitory computer-readable storage media including instructions that, when executed by one or more processors, cause the one or more processors to:

identify an entity data object associated with an input document data object using an extractive list data object associated with the entity data object and generated by:
(i) receiving, using a structured text extraction machine learning model, a structured text representation for a target document element of a training document data object,
(ii) receiving, using a structured text embedding machine learning model, an element-wise embedding based at least in part on the structured text representation for the target document element,
(iii) determining an element-wise embedding similarity measure for the element-wise embedding and a master list embedding associated with a historical extractive list data object, and
(iv) in response to determining that the element-wise embedding similarity measure satisfies an element-wise embedding similarity measure threshold, updating the historical extractive list data object with the structured text representation;

generate, using an entity scoring machine learning model, a predicted entity score for the entity data object with respect to one or more target sections of the input document data object; and initiate the performance of a prediction-based action based at least in part on the predicted entity score.

* * * * *